United States Patent
Maila et al.

(10) Patent No.: US 10,481,605 B1
(45) Date of Patent: Nov. 19, 2019

(54) AUTONOMOUS VEHICLE TECHNOLOGY FOR FACILITATING SAFE STOPPING ACCORDING TO SEPARATE PATHS

(71) Applicant: LUMINAR TECHNOLOGIES, INC., Orlando, FL (US)

(72) Inventors: Tomi P. Maila, San Carlos, CA (US); Vahid R. Ramezani, Portola Valley, CA (US); Benjamin Englard, Palo Alto, CA (US)

(73) Assignee: Luminar Technologies, Inc., Orlando, FL (US)

( * ) Notice: Subject to any disclaimer, the term of this patent is extended or adjusted under 35 U.S.C. 154(b) by 0 days.

(21) Appl. No.: 16/138,427

(22) Filed: Sep. 21, 2018

(51) Int. Cl.
| | | |
|---|---|---|
| *B60W 50/029* | (2012.01) | |
| *G05D 1/02* | (2006.01) | |
| *G08G 1/01* | (2006.01) | |
| *G01C 21/34* | (2006.01) | |

(52) U.S. Cl.
CPC ....... *G05D 1/0214* (2013.01); *G01C 21/3492* (2013.01); *G05D 1/0274* (2013.01); *G08G 1/0112* (2013.01); *G05D 2201/0212* (2013.01)

(58) Field of Classification Search
CPC .......................... G05D 1/0214; G01C 21/3492
See application file for complete search history.

(56) References Cited

U.S. PATENT DOCUMENTS

| | | | |
|---|---|---|---|
| 8,884,782 B2 | 11/2014 | Rubin et al. | |
| 9,669,827 B1 | 6/2017 | Ferguson et al. | |
| 2010/0106356 A1 | 4/2010 | Trepagnier et al. | |
| 2016/0071418 A1 | 3/2016 | Oshida et al. | |
| 2017/0069213 A1* | 3/2017 | Thomas | G08G 5/003 |
| 2018/0003515 A1* | 1/2018 | Saru | G01C 21/3415 |
| 2018/0164823 A1* | 6/2018 | She | B62D 15/025 |
| 2018/0165895 A1* | 6/2018 | Poeppel | B60T 8/17 |
| 2018/0188726 A1* | 7/2018 | Newman | G01C 21/3407 |
| 2018/0229738 A1* | 8/2018 | Nilsson | B60W 50/029 |
| 2018/0281796 A1* | 10/2018 | Ravichandran | B60W 30/181 |
| 2018/0281817 A1* | 10/2018 | Ravichandran | B60W 40/076 |
| 2018/0284793 A1 | 10/2018 | Wood et al. | |

OTHER PUBLICATIONS

Non-Final Office Action dated Nov. 27, 2018 for U.S. Appl. No. 16/138,582.

* cited by examiner

*Primary Examiner* — Jess Whittington

(57) ABSTRACT

Various software techniques for managing operation of autonomous vehicles based on sensor data are disclosed herein. A computing system may generate, based on a set of signals descriptive of a current state of an environment in which the autonomous vehicle is operating, a normal path plan separate from a safe path plan, or a hybrid path plan including a normal path plan and a safe path plan. In generating the safe path plan, the computing system may generate and concatenate a set of motion primitives. When a fault condition occurs, the computing device may transition from executing the normal path plan to executing the safe path plan to safely stop the autonomous vehicle.

20 Claims, 14 Drawing Sheets

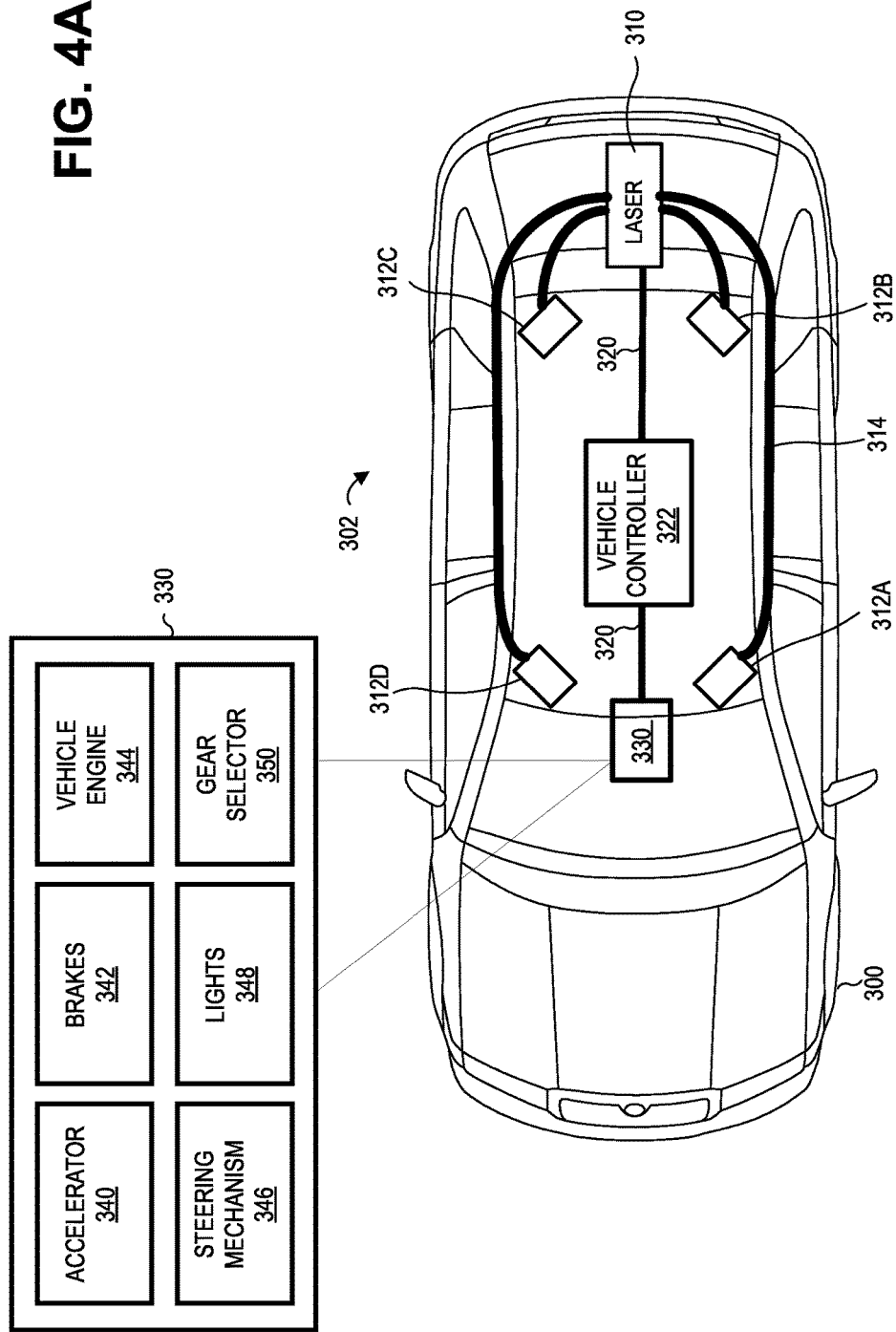

AUTONOMOUS VEHICLE TECHNOLOGY FOR FACILITATING SAFE STOPPING ACCORDING TO SEPARATE PATHS

This disclosure generally relates to autonomous vehicles and, more particularly, to techniques for facilitating safe operation of autonomous vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Self-driving or "autonomous" vehicles generally employ sensors, such as light detection and ranging (lidar) devices, to detect or "see" the surrounding environment as the vehicles move toward their destinations. Such vehicles include control systems that process the sensor data and, based on both the sensed environment and the desired destination, determine which maneuvers and operational parameters (e.g., speed, braking force, steering direction) are most appropriate on a more or less continuous basis throughout the trip. The autonomous vehicles seek not only to arrive at the desired destination, but also to maintain the safety of both the autonomous vehicle passengers and any individuals (and other vehicles) who may be in the general vicinity of the autonomous vehicles.

Achieving this goal is a formidable challenge, largely because an autonomous vehicle is surrounded by an environment that can rapidly change, with a wide variety of objects (e.g., other vehicles, pedestrians, stop signs, traffic lights, curbs, lane markings, etc.) potentially being present in virtually any location/orientation relative to the vehicle. Additionally, the sensor data that the control systems process may not be available or sufficient, which can increase the uncertainty of which movements are safe to undertake and affect the safety of the environment in which the autonomous vehicle is operating. Accordingly, there is an opportunity for platforms and techniques for facilitating safe operation of autonomous vehicles.

SUMMARY

In one embodiment, a computer-implemented method of managing operation of an autonomous vehicle moving toward a destination is provided. The method may include: generating, by one or more processors processing a set of signals descriptive of a current state of an environment in which the autonomous vehicle is operating, a normal path plan to move the autonomous vehicle toward the destination during a first time period; generating, by the one or more processors processing the set of signals, a safe path plan to safely stop the autonomous vehicle during the first time period; causing, by the one or more processors and during a first portion of the first time period, the autonomous vehicle to follow a first portion of the normal path plan; detecting, by the one or more processors and within a predetermined initial portion of the first time period, a fault condition associated with operation of the autonomous vehicle; and after detecting the fault condition, causing, by the one or more processors, the autonomous vehicle to follow the safe path plan.

In another embodiment, a non-transitory computer-readable medium storing thereon instructions executable by one or more processors to implement a control architecture for controlling a vehicle is provided. The control architecture may include a perception component configured to: receive sensor data generated by one or more sensors of the vehicle, wherein the one or more sensors are configured to sense an environment in which the vehicle is operating, and generate, based on the sensor data, a set of signals descriptive of a current state of the environment. The control architecture may further include a path planning component configured to: generate, based on the set of signals descriptive of the current state of the environment, a normal path plan to move the vehicle toward a destination during a first time period, and generate, based on the set of signals, a safe path plan to safely stop the vehicle during the first time period. Additionally, the control architecture may include a control component configured to: cause, during a first portion of the first time period, the vehicle to follow a first portion of the normal path plan, and in response to a fault condition associated with operation of the vehicle being detected within a predetermined initial portion of the first time period, cause the vehicle to follow the safe path plan.

In a further embodiment, a system within an autonomous vehicle may be provided. The system may include a set of sensors configured to generate a set of sensor data associated with operation of the autonomous vehicle; and a computing system configured to: generate, based on the set of sensor data, a set of signals descriptive of a current state of an environment in which the autonomous vehicle is operating, process the set of signals to: generate a normal path plan to move the autonomous vehicle toward a destination during a first time period, and generate a safe path plan to safely stop the autonomous vehicle during the first time period, cause, during a first portion of the first time period, the autonomous vehicle to follow a first portion of the normal path plan, detect, within a predetermined initial portion of the first time period, a fault condition associated with operation of the autonomous vehicle, and after detecting the fault condition, cause the autonomous vehicle to follow the safe path plan.

BRIEF DESCRIPTION OF THE DRAWINGS

FIG. 4A illustrates an example vehicle in which the lidar system of FIG. 2 may operate, in accordance with some embodiments;

DETAILED DESCRIPTION

Overview

Figure 1:
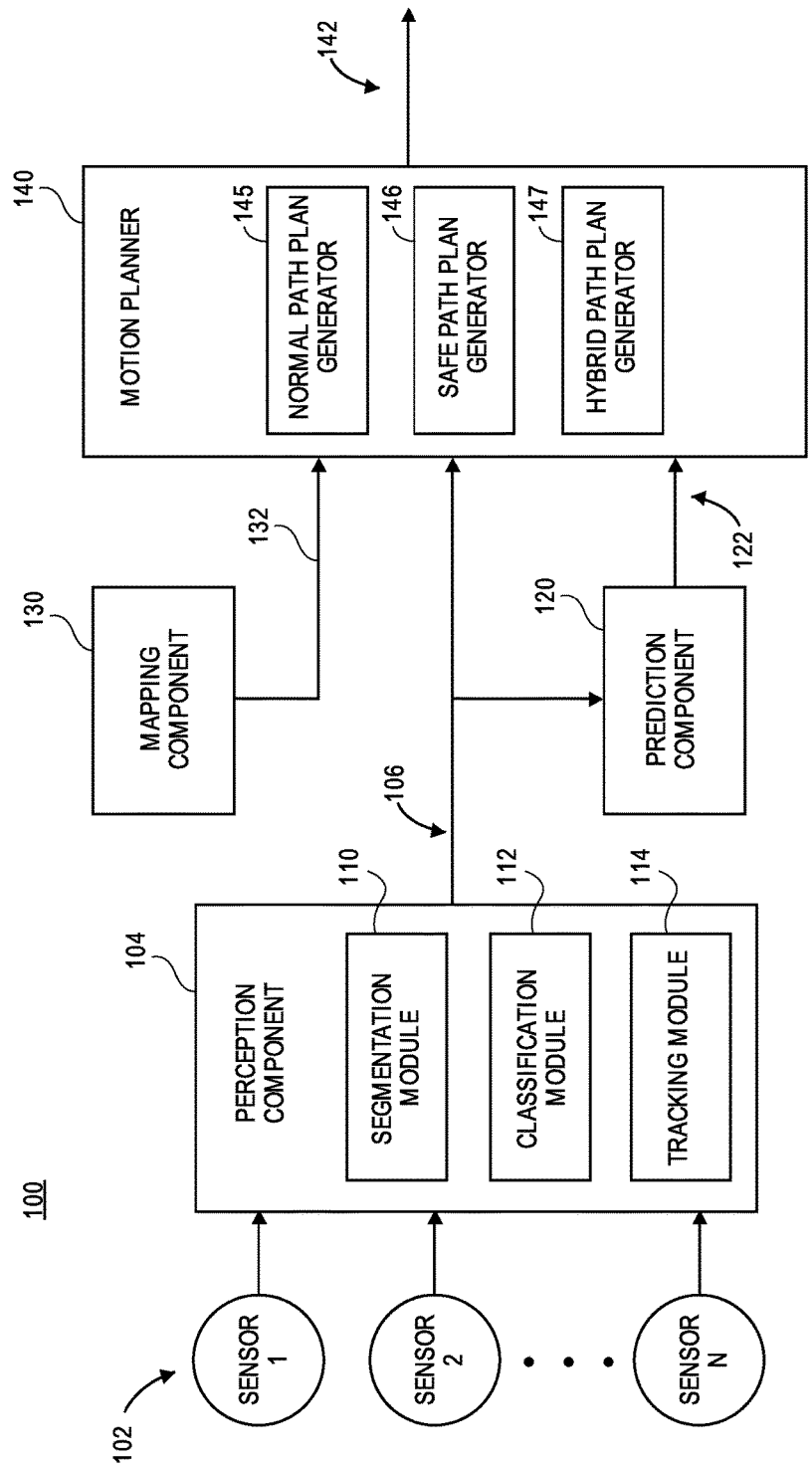
FIG. 1 is a block diagram of an example software architecture for facilitating control of an autonomous vehicle, in accordance with some embodiments.

The present embodiments describe techniques for determining and implementing safe stopping of autonomous vehicles. In particular, a safe stopping path is continuously determined/updated, and can be implemented in response to fault conditions such as failure of sensors or other components of a control architecture.

The vehicle may be a fully self-driving or "autonomous" vehicle, or a semi-autonomous vehicle that may be at least partially controlled by a human driver. For example, the disclosed techniques may use sensors to capture vehicle environment information to improve the safety and performance of an autonomous vehicle. The sensors may be any type or types of sensors capable of sensing an environment through which the vehicle is moving, such as lidar, radar, cameras, and/or other types of sensors. The vehicle may also include other sensors, such as inertial measurement units (IMUs), and/or include other types of devices that provide information on the current position of the vehicle (e.g., a GPS unit).

The sensor data (and possibly other data) is processed by a perception component of the vehicle, which outputs signals indicative of the current state of the vehicle's environment. For example, the perception component may identify positions of (and possibly classify and/or track) objects within the vehicle's environment. As a more specific example that utilizes lidar or radar data, the perception component may include (1) a segmentation module that partitions lidar or radar point clouds devices into subsets of points that correspond to probable objects, (2) a classification module that determines labels/classes for the subsets of points (segmented objects), and (3) a tracking module that tracks segmented and/or classified objects over time (i.e., across subsequent point cloud frames).

Generally, an autonomous vehicle operates in "normal" conditions whereby the autonomous vehicle has continued access to sensor data indicative of a current state of an environment in which the autonomous vehicle is operating (e.g., moving toward a destination). However, fault conditions may arise during operation of the autonomous vehicle. For example, one or more sensors may fail and may cease generating sensor data. As an additional example, a primary control module may not receive an updated path plan from a path planning module. In these situations, the autonomous vehicle may be limited or prevented from continued normal operation. This inability of the autonomous vehicle to accurately assess its environment, and/or to generate appropriate path plan updates, results in an unsafe situation for the autonomous vehicle and any surrounding vehicles and/or associated individuals.

In a first implementation, a control architecture may continuously process sensor data indicative of a current state of an environment in which an autonomous vehicle is operating, and generate two distinct, alternative path plans for a specific, future time period: a "normal path plan" intended to move the autonomous vehicle toward a specified destination, and a "safe path plan" intended to safely stop the autonomous vehicle, such as by guiding the vehicle to a roadside location and stopping the vehicle. Each of the normal path plan and the safe path plan may extend over a specified time period or window (e.g., 1 second) during which it may be implemented or executed. During a predetermined initial portion of the specified time period (e.g., the first 200 ms), the control architecture may cause the autonomous vehicle to follow a first portion of the normal path plan.

Periodically, the control architecture may at least attempt to process updated sensor data to generate an updated normal path plan and an updated safe path plan. When operating without fault, the control architecture generates an updated normal path plan and an updated safe path plan before expiration of the initial portion of the specified time period (e.g., within the first 200 ms) of the current normal path plan. The control architecture may cause the autonomous vehicle to complete execution of the initial portion (e.g., the first 200 ms) of the current normal path plan, and then execute the initial portion of the updated normal path plan. This cycle of using only the initial portion of the normal path plan, and then updating with a new normal path plan, may repeat indefinitely so long as the control architecture is able to generate the updated normal path plans in the initial portions of the respective time periods.

However, one or more fault conditions may occur in which the control architecture does not have access to a requisite amount of sensor data to accurately assess the vehicle environment, or otherwise cannot function correctly. A fault condition may thus result in the control architecture not generating an updated path plan (or in some cases, generating a malformatted path, an error message, or the like) within the predetermined initial portion of the specified time period. In the event of a fault condition during (or at the expiration of) the initial portion of the specified time period, the control architecture may automatically transition to causing the autonomous vehicle to follow the separately-generated safe path plan. Thus, the autonomous vehicle may operate to a safe stopping location in accordance with the safe path plan even when any of the upstream components of the control architecture fail.

In a second implementation, the control architecture may continuously process sensor data indicative of a current state of an environment in which an autonomous vehicle is operating and generate a single, hybrid path plan for the autonomous vehicle on a periodic basis. The hybrid path plan may extend over a predetermined time period (e.g., 1 second) and may include both a normal path plan intended to move the autonomous vehicle toward a specified destination, and a safe path plan intended to safely stop the autonomous vehicle, such as by guiding the vehicle to a roadside location and stopping the vehicle. The normal path plan occupies an initial portion of the time period and the safe path plan occupies a subsequent portion of the time period. For example, if the time period is one (1) second, the normal path plan may occupy the initial 200 ms and the safe path plan may occupy the remaining 800 ms. During the initial portion of the time period, the control architecture may cause the autonomous vehicle to follow the normal path plan.

Periodically, the control architecture may at least attempt to process updated sensor data to generate an updated hybrid path plan that includes an updated normal path plan (the initial segment) and an updated safe path plan (the subsequent segment). When operating without fault, the control architecture generates an updated hybrid path plan within the initial portion (e.g., the first 200 ms) of the current hybrid path plan. The control architecture may then cause the autonomous vehicle to complete execution of the initial portion of the current hybrid path plan (i.e., the portion of the current hybrid path plan that contains a normal path plan), and then execute the initial portion of the updated hybrid path plan (i.e., the portion of the updated hybrid path plan that contains a normal path plan). This cycle of using only the initial portion of the hybrid path plan, and then updating with a new hybrid path plan, may repeat indefinitely so long as the control architecture is able to generate the updated hybrid path plans in the initial portions of the respective time periods.

However, one or more fault conditions may occur in which the control architecture may not function correctly or may otherwise not have access to a requisite amount of sensor data to accurately assess the vehicle environment, or otherwise cannot function correctly. A fault condition may thus result in the control architecture not generating an updated hybrid path plan (or in some cases, generating a malformatted path, an error message, or the like) within the predetermined initial portion of the specified time period. In the event of a fault condition during (or at the expiration of) the initial portion of the specified time period, the control architecture may cause the autonomous vehicle to continue to execute or implement the subsequent portion of the hybrid path plan that reflects a safe stopping path. In particular, the control architecture may cause the autonomous vehicle to fully execute the normal path plan throughout the initial portion of the time period and, after the expiration of the initial portion of the time period, to fully execute the safe path plan throughout the subsequent portion of the time period. Thus, the autonomous vehicle may operate to a safe stopping location in accordance with the safe path plan even when any of the upstream components of the control architecture fail.

In generating a path plan such as a safe path plan (e.g., according to one of the above embodiments, or in an embodiment where safe path plans are only generated upon detecting a sensor failure, etc.), the control architecture may determine a sequence of individual movements or "motion primitives" for the autonomous vehicle to execute. According to some embodiments, each motion primitive may represent an approximation of a straight path line segment on which to move the autonomous vehicle. The control architecture may determine the sequence of motion primitives based on a combination of factors, such as current sensor data indicative of the environment in which the autonomous vehicle is operating (including any detected additional vehicles, lanes markings, etc.), the roadway position of the autonomous vehicle, a lapse of time since a recent sensor data access, and/or potential safe pullover locations to which the autonomous vehicle may be directed.

In the discussion below, an example control architecture for managing operation of an autonomous vehicle will first be discussed, with reference to FIG. 1. Because many of the architectures and techniques discussed herein may utilize lidar sensors, example lidar systems are then discussed with reference to FIGS. 2-5. An example self-driving control architecture, which may make use of any of the control architectures discussed herein, is then described with reference to FIG. 6. Thereafter, example path plans in accordance with the separate path plan implementation are discussed with reference to FIG. 7, example path plans in accordance with the hybrid path plan implementation are discussed with reference to FIG. 8, and an example path plan with a plurality of motion primitives are discussed with reference to FIG. 9. Finally, example methods related to managing operation of an autonomous vehicle and/or generating path plans are discussed with reference to the flow diagrams of FIGS. 10-12.

Example Architecture for Controlling Sensor Parameter(s) Based on Dynamic Objects FIG. 1 illustrates an example self-driving control architecture ("SDCA") 100, which is used to facilitate control of a vehicle such as an autonomous vehicle. A set of sensors 102 may be utilized by the autonomous vehicle (e.g., to make intelligent driving decisions based on the vehicle's current environment), or by a non-autonomous vehicle for other purposes (e.g., to collect data pertaining to a particular driving trip). As the term is used herein, an "autonomous" or "self-driving" vehicle is a vehicle configured to sense its environment and navigate or drive with no human input, with little human input, with optional human input, and/or with circumstance-specific human input. For example, an autonomous vehicle may be configured to drive to any suitable location and control or perform all safety-critical functions (e.g., driving, steering, braking, parking) for the entire trip, with the driver not being expected (or even able) to control the vehicle at any time. As another example, an autonomous vehicle may allow a driver to safely turn his or her attention away from driving tasks in particular environments (e.g., on freeways) and/or in particular driving modes.

An autonomous vehicle may be configured to drive with a human driver present in the vehicle, or configured to drive with no human driver present. As an example, an autonomous vehicle may include a driver's seat with associated controls (e.g., steering wheel, accelerator pedal, and brake pedal), and the vehicle may be configured to drive with no one seated in the driver's seat or with limited, conditional, or no input from a person seated in the driver's seat. As another example, an autonomous vehicle may not include any driver's seat or associated driver's controls, with the vehicle performing substantially all driving functions (e.g., driving, steering, braking, parking, and navigating) at all times without human input (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

As the term is used herein, a "vehicle" may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), or spacecraft. In particular embodiments, a vehicle may include an internal combustion engine or an electric motor that provides propulsion for the vehicle.

As seen in FIG. 1, the vehicle includes N different sensors 102, with N being any suitable integer (e.g., 1, 2, 3, 5, 10, 20, etc.). At least "Sensor 1" of the sensors 102 is configured to sense the environment of the autonomous vehicle by physically interacting with the environment in some way, such as transmitting and receiving laser beams that reflect off of objects in the environment (e.g., if the sensor is a lidar device), transmitting and receiving acoustic signals that reflect off of objects in the environment (e.g., if the sensor is a radar device), simply receiving light waves generated or reflected from different areas of the environment (e.g., if the sensor is a camera), and so on. Depending on the embodiment, all of the sensors 102 may be configured to sense portions of the environment, or one or more of the sensors 102 may not physically interact with the external environment (e.g., if one of the sensors 102 is an inertial measurement unit (IMU)). The sensors 102 may all be of the same type, or may include a number of different sensor types (e.g., multiple lidar devices with different viewing perspectives, and/or a combination of lidar, camera, radar, thermal imaging devices, IMUs, etc.).

The sensors 102 may be configured to generate corresponding sensor data, which may be the same type or different types among the sensors 102. For example, "Sensor 1" may be a first lidar device that generates point cloud frames, "Sensor 2" may be a second lidar device that generates point cloud frames, "Sensor 3" (not shown in FIG. 1) may be a camera that generates frames of digital images, and so on.

The data generated by the sensors 102 is input to a perception component 104 of the SDCA 100, and is processed by the perception component 104 to generate perception signals 106 descriptive of a current state of the vehicle's environment. It is understood that the term "current" may actually refer to a very short time prior to the generation of any given perception signals 106, e.g., due to the short processing delay introduced by the perception component 104 and other factors. To generate the perception signals 106, the perception component 104 may include a segmentation module 110, a classification module 112, and a tracking module 114.

The segmentation module 110 is generally configured to identify distinct objects within the environment, as represented by the sensor data (or a portion of the sensor data). Depending on the embodiment and/or scenario, the segmentation task may be performed separately for each of a number of different types of sensor data (e.g., the segmentation module 110 may include a number of modules operating in parallel), or may be performed jointly on a fusion of multiple types of sensor data. In some embodiments where lidar devices are used, the segmentation module 110 analyzes point cloud frames to identify subsets of points within each frame that correspond to probable physical objects in the environment. In other embodiments, the segmentation module 110 jointly analyzes lidar point cloud frames in conjunction with camera (and/or other) image frames to identify objects in the environment. Examples of lidar devices/systems and point clouds are discussed in further detail below, with reference to FIGS. 2-5. Other suitable techniques, and/or data from other suitable sensor types, may also be used to identify objects. As used herein, references to different or distinct "objects" may encompass physical things that are entirely disconnected (e.g., with two vehicles being two different "objects"), as well as physical things that are connected or partially connected (e.g., with a vehicle being a first "object" and the vehicle's hitched trailer being a second "object").

The segmentation module 110 may use predetermined rules or algorithms to identify objects. For example, the segmentation module 110 may identify as distinct objects, within a point cloud, any clusters of points that meet certain criteria (e.g., having no more than a certain maximum distance between all points in the cluster, etc.). Alternatively, the segmentation module 110 may utilize a neural network that has been trained to identify distinct objects within the environment (e.g., using supervised learning with manually generated labels for different objects within test data point clouds, etc.), or another suitable type of machine learning based model. Example operation of the segmentation module 110 is discussed in more detail below in FIG. 5B, for an embodiment in which the perception component 104 processes point cloud data.

The classification module 112 is generally configured to determine classes (labels, categories, etc.) for different objects that have been identified by the segmentation module 110. Like the segmentation module 110, the classification module 112 may perform classification separately for different sets of the sensor data (e.g., the classification module 112 may include a number of modules operating in parallel), or may classify objects based on a fusion of data from multiple sensors, etc. Moreover, and also similar to the segmentation module 110, the classification module 112 may execute predetermined rules or algorithms to classify objects, use a neural network that has been trained to classify identified objects within the environment (e.g., using supervised learning with manually generated labels for different point cloud representations of distinct objects, etc.), or use another suitable machine learning based model to classify objects. Example operation of the classification module 112 is discussed in more detail below in FIG. 5B, for an embodiment in which the perception component 104 processes point cloud data.

The tracking module 114 is generally configured to track distinct objects over time (e.g., across multiple lidar point cloud or camera image frames). The tracked objects are generally objects that have been identified by the segmentation module 110, but may or may not be objects that were classified by the classification module 112, depending on the embodiment and/or scenario. The segmentation module 110 may assign identifiers to identified objects, and the tracking module 114 may associate existing identifiers with specific objects where appropriate (e.g., for lidar data, by associating the same identifier with different clusters of points, at different locations, in successive point cloud frames). Like the segmentation module 110 and the classification module 112, the tracking module 114 may perform separate object tracking based on different sets of the sensor data (e.g., the tracking module 114 may include a number of modules operating in parallel), or may track objects based on a fusion of data from multiple sensors. Moreover, and also similar to the segmentation module 110 and the classification module 112, the tracking module 114 may execute predetermined rules or algorithms to track objects, may use a neural network that has been trained to track identified (and possibly classified) objects within the environment (e.g., using supervised learning with manually generated labels for different pairs or sets of point cloud frames, etc.), or another suitable machine learning model to track objects.

Because the blocks of FIG. 1 (and various other figures described herein) depict a software architecture rather than physical components, it is understood that, when any reference is made herein to a particular neural network or other software architecture component being "trained," or to the role of any software architecture component (e.g., sensors 102) in conducting such training, the operations or procedures described may have occurred on a different computing system (e.g., using specialized development software). Thus, for example, neural networks of the segmentation module 110, classification module 112 and/or tracking module 114 may have been trained on a different computer system before being implemented within any vehicle. Put differently, the components of the SDCA 100 may be included in a "final" product within a particular vehicle, without that vehicle or its physical components (sensors 102, etc.) necessarily having been used for any training processes.

The SDCA 100 also includes a prediction component 120, which processes the perception signals 106 to generate prediction signals 122 descriptive of one or more predicted future states of the vehicle's environment. For a given object, for example, the prediction component 120 may analyze the type/class of the object (as determined by the classification module 112) along with the recent tracked movement of the object (as determined by the tracking module 114) to predict one or more future positions of the object. As a relatively simple example, the prediction component 120 may assume that any moving objects will continue to travel with no change to their current direction and speed, possibly taking into account first- or higher-order derivatives to better track objects that have continuously changing directions, objects that are accelerating, and so on. In some embodiments, the prediction component 120 also predicts movement of objects based on more complex behaviors. For example, the prediction component 120 may assume that an object that has been classified as another vehicle will follow rules of the road (e.g., stop when approaching a red light), and will react in a certain way to other dynamic objects (e.g., attempt to maintain some safe distance from other vehicles). The prediction component 120 may inherently account for such behaviors by utilizing a neural network or other suitable machine learning model, for example. In some embodiments, the prediction component 120 may be omitted from the SDCA 100 (e.g., if the vehicle does not perform any prediction of future environment states).

In some embodiments, the perception signals 106 include data representing "occupancy grids" (e.g., one grid per T milliseconds), with each occupancy grid indicating object positions (and possibly object boundaries, orientations, etc.) within an overhead view of the autonomous vehicle's environment. Within the occupancy grid, each "cell" (e.g., pixel) may be associated with a particular class as determined by the classification module 114, possibly with an "unknown" class for certain pixels that were not successfully classified. Similarly, the prediction signals 122 may include, for each such grid generated by the perception component 104, one or more "future occupancy grids" that indicate predicted object positions, boundaries and/or orientations at one or more future times (e.g., 1, 2 and 5 seconds ahead). In other embodiments, the SDCA 100 does not generate or utilize occupancy grids.

The SDCA 100 may further include a mapping component 130 configured to obtain map data (e.g., a digital map including the area currently being traversed by the autonomous vehicle) and/or navigation data (e.g., data indicating a route for the autonomous vehicle to reach the destination, such as turn-by-turn instructions), and output the data (possibly in a converted format) as mapping and navigation signals 132. In some embodiments, the mapping and navigation signals 132 include other map- or location-related information, such as speed limits, traffic indicators, and so on. The signals 132 may be obtained from a remote server (e.g., via a cellular or other communication network of the autonomous vehicle, or of a smartphone coupled to the autonomous vehicle, etc.), and/or may be locally stored in a persistent memory of the autonomous vehicle.

Additionally, the SDCA 100 may include a motion planner 140 configured to process the perception signals 106, the prediction signals 122, and the mapping and navigation signals 132 to generate decisions 142 regarding the next movements of the autonomous vehicle. Depending on the type of the motion planner 140, the decisions 142 may be operational parameters (e.g., braking, speed and steering parameters) or particular maneuvers (e.g., turn left, move to right lane, move onto shoulder of road, etc.). The decisions 142 may be provided to one or more operational subsystems of the autonomous vehicle (e.g., if the decisions 142 indicate specific operational parameters), or may be provided to one or more intermediate stages that convert the decisions 142 to operational parameters (e.g., if the decisions indicate specific maneuvers). The operational subsystems may include one, some or all of the components 330 of FIG. 4A, for example.

The motion planner 140 may utilize any suitable type(s) of rules, algorithms, heuristic models, machine learning models, or other suitable techniques to make driving decisions based on the perception signals 106, prediction signals 122, and mapping and navigation signals 132. For example, the motion planner 140 may be a "learning based" planner (e.g., a planner that is trained using supervised learning or reinforcement learning), a "search based" planner (e.g., a continuous A* planner), a "sampling based" planner (e.g., a planner that performs random searches in a space that represents a universe of possible decisions), a "predictive control based" planner (e.g., a model predictive control (MPC) planner), and so on.

In some embodiments, the autonomous vehicle includes one or more other SDCAs, in addition to the SDCA 100, and uses suitable techniques to generate "final" decisions (for controlling the operational subsystems) based on the decisions 142 and the decisions of the other SDCA(s). For example, final decisions may be generated by calculating the geometric mean of the operational parameters produced by the different SDCAs, by determining which maneuvers are indicated by the most SDCAs in any given scenario, and/or by using trained neural networks to determine which SDCA decisions to select/implement in specific situations.

According to embodiments, the motion planner 140 may include a normal path plan generator 145, a safe path plan generator 146, and a hybrid path plan generator 147 to generate the decisions 142 in the form of one or more path plans. In some implementations, the motion planner 140 may include just the normal path plan generator 145 and the safe path plan generator 146; in other implementations, the motion planner 140 may include just the hybrid path plan generator 147.

In the separate path plan implementation as discussed herein, the normal path plan generator 145 and the safe path plan generator 146 may generate, based on any combination of the perception signals 106, the prediction signals 122, and the mapping and navigation signals 132, a normal path plan and a safe path plan, respectively. In the hybrid path plan implementation as discussed herein, the hybrid path plan generator 147 may generate, based on any combination of the perception signals 106, the prediction signals 122, and the mapping and navigation signals 132, a hybrid path plan that may include a normal path plan in sequence or combination with a safe path plan. Generally, a safe path plan may include a set of individual motion primitives, which the safe path plan generator 146 (or the hybrid path plan generator 147) may generate based on any combination of the perception signals 106, the prediction signals 122, and the mapping and navigation signals 132.

Example Lidar Systems

As seen from various examples provided above, sensor data collected by a vehicle may in some embodiments include point cloud data that is generated by one or more lidar devices or, more generally, a lidar system. To provide a better understanding of the types of data that may be generated by lidar systems, and of the manner in which lidar systems and devices may function, example lidar systems and point clouds will now be described with reference to FIGS. 2-5.

Figure 2:
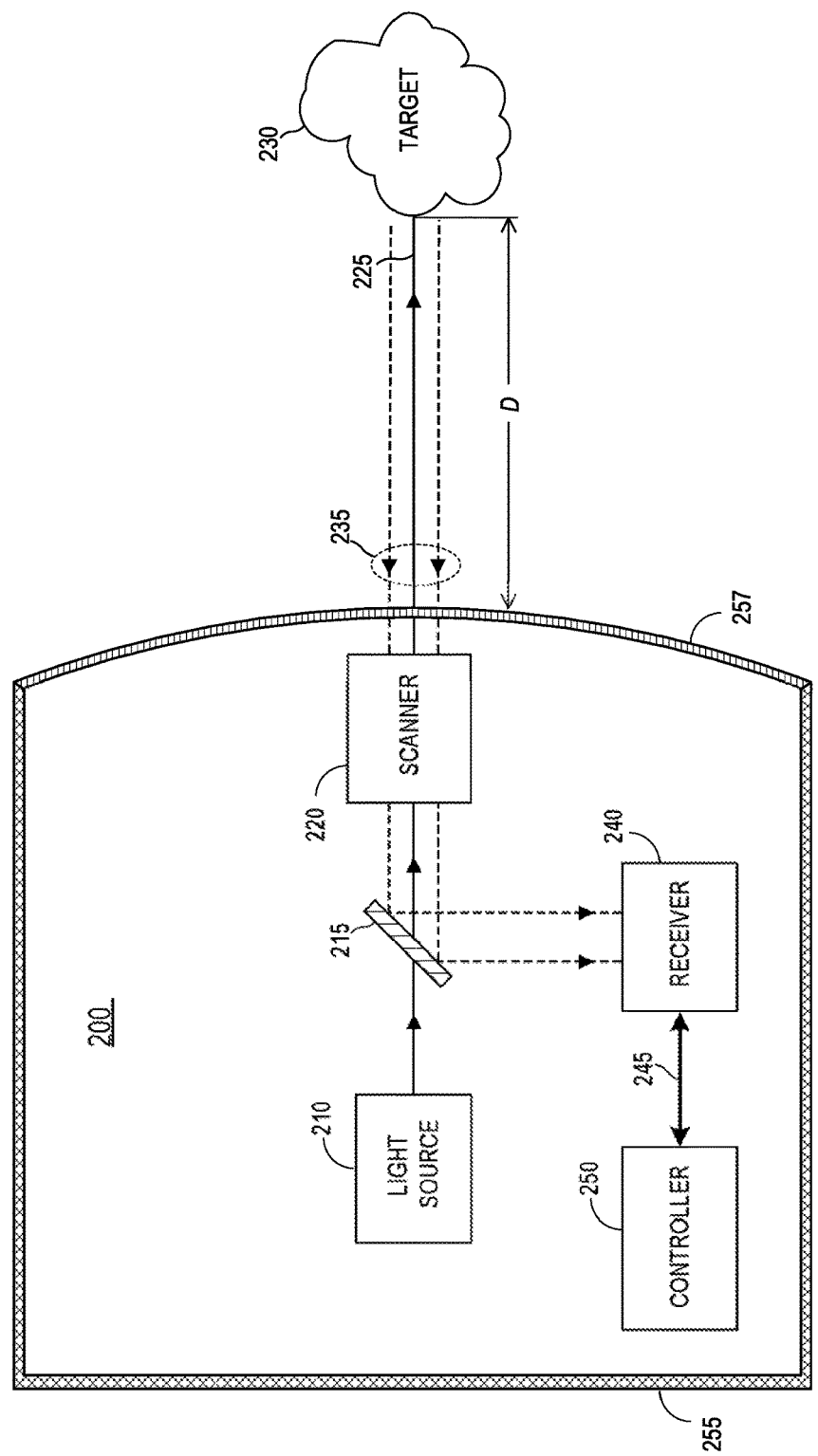
FIG. 2 is a block diagram of an example light detection and ranging (lidar) system that may be controlled using the architecture of FIG. 1, in accordance with some embodiments.

In FIG. 2, a lidar system 200 may be used as at least one of the sensors 102 of FIG. 1, for example. While various lidar system components and characteristics are described herein, it is understood that any suitable lidar device(s) or system(s), and/or any other suitable types of sensors, may provide sensor data for processing using the software architectures described herein.

The example lidar system 200 may include a light source 210, a mirror 215, a scanner 220, a receiver 240, and a controller 250. The light source 210 may be, for example, a laser (e.g., a laser diode) that emits light having a particular operating wavelength in the infrared, visible, or ultraviolet portions of the electromagnetic spectrum. In operation, the light source 210 emits an output beam of light 225 which may be continuous-wave, pulsed, or modulated in any suitable manner for a given application. The output beam of light 225 is directed downrange toward a remote target 230 located a distance D from the lidar system 200 and at least partially contained within a field of regard of the system 200.

Once the output beam 225 reaches the downrange target 230, the target 230 may scatter or, in some cases, reflect at least a portion of light from the output beam 225, and some of the scattered or reflected light may return toward the lidar system 200. In the example of FIG. 2, the scattered or reflected light is represented by input beam 235, which passes through the scanner 220, which may be referred to as a beam scanner, optical scanner, or laser scanner. The input beam 235 passes through the scanner 220 to the mirror 215, which may be referred to as an overlap mirror, superposition mirror, or beam-combiner mirror. The mirror 215 in turn directs the input beam 235 to the receiver 240.

The input beam 235 may include light from the output beam 225 that is scattered by the target 230, light from the output beam 225 that is reflected by the target 230, or a combination of scattered and reflected light from target 230. According to some implementations, the lidar system 200 can include an "eye-safe" laser that present little or no possibility of causing damage to a person's eyes. The input beam 235 may contain only a relatively small fraction of the light from the output beam 225.

The receiver 240 may receive or detect photons from the input beam 235 and generate one or more representative signals. For example, the receiver 240 may generate an output electrical signal 245 that is representative of the input beam 235. The receiver may send the electrical signal 245 to the controller 250. Depending on the implementation, the controller 250 may include one or more instruction-executing processors, an application-specific integrated circuit (ASIC), a field-programmable gate array (FPGA), and/or other suitable circuitry configured to analyze one or more characteristics of the electrical signal 245 in order to determine one or more characteristics of the target 230, such as its distance downrange from the lidar system 200. More particularly, the controller 250 may analyze the time of flight or phase modulation for the beam of light 225 transmitted by the light source 210. If the lidar system 200 measures a time of flight of T (e.g., T representing a round-trip time of flight for an emitted pulse of light to travel from the lidar system 200 to the target 230 and back to the lidar system 200), then the distance D from the target 230 to the lidar system 200 may be expressed as $D=c \cdot T/2$, where c is the speed of light (approximately $3.0 \times 10^8$ m/s).

The distance D from the lidar system 200 is less than or equal to a maximum range $R_{MAX}$ of the lidar system 200. The maximum range $R_{MAX}$ (which also may be referred to as a maximum distance) of a lidar system 200 may correspond to the maximum distance over which the lidar system 200 is configured to sense or identify targets that appear in a field of regard of the lidar system 200. The maximum range of lidar system 200 may be any suitable distance, such as 50 m, 200 m, 500 m, or 1 km, for example.

In some implementations, the light source 210, the scanner 220, and the receiver 240 may be packaged together within a single housing 255, which may be a box, case, or enclosure that holds or contains all or part of the lidar system 200. The housing 255 includes a window 257 through which the beams 225 and 235 pass. The controller 250 may reside within the same housing 255 as the components 210, 220, and 240, or the controller 250 may reside outside of the housing 255. In one embodiment, for example, the controller 250 may instead reside within, or partially within, the perception component 104 of the SDCA 100 shown in FIG. 1. In some implementations, the housing 255 includes multiple lidar sensors, each including a respective scanner and a receiver. Depending on the particular implementation, each of the multiple sensors can include a separate light source or a common light source. The multiple sensors can be configured to cover non-overlapping adjacent fields of regard or partially overlapping fields of regard, for example, depending on the implementation.

As depicted in FIG. 2, the output beam 225 and input beam 235 may be substantially coaxial. In other words, the output beam 225 and input beam 235 may at least partially overlap or share a common propagation axis, so that the input beam 235 and the output beam 225 travel along substantially the same optical path (albeit in opposite directions). As the lidar system 200 scans the output beam 225 across a field of regard, the input beam 235 may follow along with the output beam 225, so that the coaxial relationship between the two beams is maintained.

Generally, the scanner 220 may steer the output beam 225 in one or more directions downrange. To accomplish this, the scanner 220 may include one or more scanning mirrors and one or more actuators driving the mirrors to rotate, tilt, pivot, or move the mirrors in an angular manner about one or more axes, for example. While FIG. 2 depicts only a single mirror 215, the lidar system 200 may include any suitable number of flat or curved mirrors (e.g., concave, convex, or parabolic mirrors) to steer or focus the output beam 225 or the input beam 235. For example, the first mirror of the scanner may scan the output beam 225 along a first direction, and the second mirror may scan the output beam 225 along a second direction that is substantially orthogonal to the first direction.

A "field of regard" of the lidar system 200 may refer to an area, region, or angular range over which the lidar system 200 may be configured to scan or capture distance information. When the lidar system 200 scans the output beam 225 within a 30-degree scanning range, for example, the lidar system 200 may be referred to as having a 30-degree angular field of regard. The scanner 220 may be configured to scan the output beam 225 horizontally and vertically, and the field of regard of the lidar system 200 may have a particular angular width along the horizontal direction and another particular angular width along the vertical direction. For example, the lidar system 200 may have a horizontal field of regard of 10° to 120° and a vertical field of regard of 2° to 45°.

The one or more scanning mirrors of the scanner 220 may be communicatively coupled to the controller 250, which may control the scanning mirror(s) so as to guide the output beam 225 in a desired direction downrange or along a desired scan pattern. In general, a scan (or scan line) pattern may refer to a pattern or path along which the output beam 225 is directed. The lidar system 200 can use the scan pattern to generate a point cloud with points or "pixels" that substantially cover the field of regard. The pixels may be approximately evenly distributed across the field of regard, or distributed according to a particular non-uniform distribution.

In operation, the light source 210 may emit pulses of light which the scanner 220 scans across a field of regard of the lidar system 200. The target 230 may scatter one or more of the emitted pulses, and the receiver 240 may detect at least a portion of the pulses of light scattered by the target 230. The receiver 240 may receive or detect at least a portion of the input beam 235 and produce an electrical signal that corresponds to the input beam 235. The controller 250 may be electrically coupled or otherwise communicatively coupled to one or more of the light source 210, the scanner 220, and the receiver 240. The controller 250 may provide instructions, a control signal, or a trigger signal to the light source 210 indicating when the light source 210 should produce optical pulses, and possibly characteristics (e.g., duration, period, peak power, wavelength, etc.) of the pulses. The controller 250 may also determine a time-of-flight value for an optical pulse based on timing information associated with when the pulse was emitted by light source 210 and when a portion of the pulse (e.g., the input beam 235) was detected or received by the receiver 240.

As indicated above, the lidar system 200 may be used to determine the distance to one or more downrange targets 230. By scanning the lidar system 200 across a field of regard, the system can be used to map the distance to a number of points within the field of regard. Each of these depth-mapped points may be referred to as a pixel or a voxel. A collection of pixels captured in succession (which may be referred to as a depth map, a point cloud, or a point cloud frame) may be rendered as an image or may be analyzed to identify or detect objects or to determine a shape or distance of objects within the field of regard. For example, a depth map may cover a field of regard that extends 60° horizontally and 15° vertically, and the depth map may include a frame of 100-2000 pixels in the horizontal direction by 4-400 pixels in the vertical direction.

The lidar system 200 may be configured to repeatedly capture or generate point clouds of a field of regard at any suitable frame rate between approximately 0.1 frames per second (FPS) and approximately 1,000 FPS, for example. The point cloud frame rate may be substantially fixed or dynamically adjustable, depending on the implementation. In general, the lidar system 200 can use a slower frame rate (e.g., 1 Hz) to capture one or more high-resolution point clouds, and use a faster frame rate (e.g., 10 Hz) to rapidly capture multiple lower-resolution point clouds.

The field of regard of the lidar system 200 can overlap, encompass, or enclose at least a portion of the target 230, which may include all or part of an object that is moving or stationary relative to lidar system 200. For example, the target 230 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Figure 3:
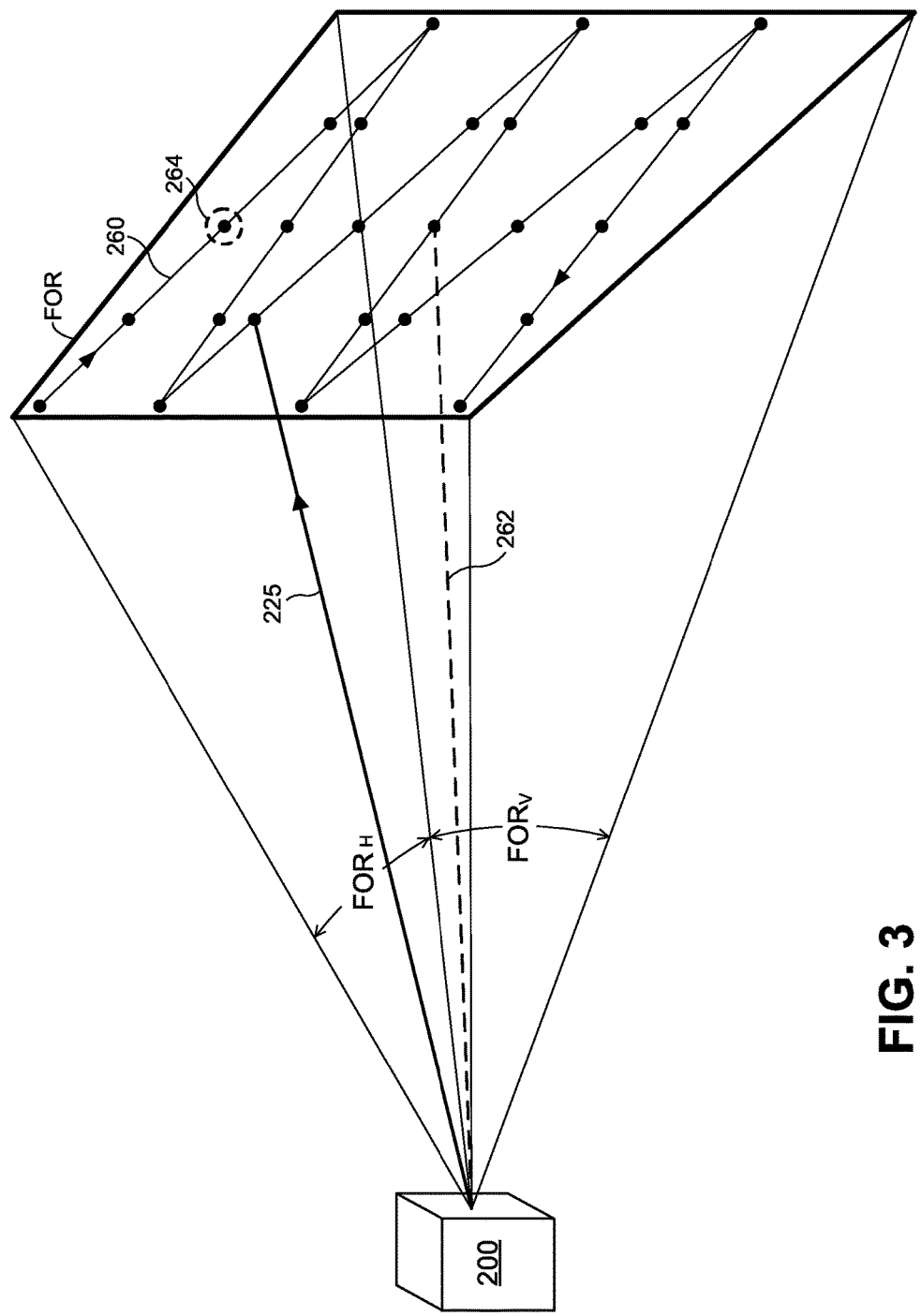
FIG. 3 illustrates an example scan pattern which the lidar system of FIG. 2 may produce when identifying targets within a field of regard, in accordance with some embodiments.

FIG. 3 illustrates an example scan pattern 260 which the lidar system 200 of FIG. 2 may produce. In particular, the lidar system 200 may be configured to scan the output optical beam 225 along the scan pattern 260. In some implementations, the scan pattern 260 corresponds to a scan across any suitable field of regard having any suitable horizontal field of regard ($FOR_H$) and any suitable vertical field of regard ($FOR_V$). For example, a certain scan pattern may have a field of regard represented by angular dimensions (e.g., $FOR_H \times FOR_V$) 40°×30°, 90°×40°, or 60°×15°. While FIG. 3 depicts a "zig-zag" pattern 260, other implementations may instead employ other patterns (e.g., parallel, horizontal scan lines), and/or other patterns may be employed in specific circumstances.

In the example implementation and/or scenario of FIG. 3, reference line 262 represents a center of the field of regard of scan pattern 260. In FIG. 3, if the scan pattern 260 has a 60°×15° field of regard, then the scan pattern 260 covers a ±30° horizontal range with respect to reference line 262 and a ±7.5° vertical range with respect to reference line 262. An azimuth (which may be referred to as an azimuth angle) may represent a horizontal angle with respect to the reference line 262, and an altitude (which may be referred to as an altitude angle, elevation, or elevation angle) may represent a vertical angle with respect to the reference line 262.

The scan pattern 260 may include multiple points or pixels 264, and each pixel 264 may be associated with one or more laser pulses and one or more corresponding distance measurements. A cycle of scan pattern 260 may include a total of $P_x \times P_y$ pixels 264 (e.g., a two-dimensional distribution of $P_x$ by $P_y$ pixels). The number of pixels 264 along a horizontal direction may be referred to as a horizontal resolution of the scan pattern 260, and the number of pixels 264 along a vertical direction may be referred to as a vertical resolution of the scan pattern 260.

Each pixel 264 may be associated with a distance (e.g., a distance to a portion of a target 230 from which the corresponding laser pulse was scattered) or one or more angular values. As an example, the pixel 264 may be associated with a distance value and two angular values (e.g., an azimuth and altitude) that represent the angular location of the pixel 264 with respect to the lidar system 200. A distance to a portion of the target 230 may be determined based at least in part on a time-of-flight measurement for a corresponding pulse. An angular value (e.g., an azimuth or altitude) may correspond to an angle (e.g., relative to reference line 262) of the output beam 225 (e.g., when a corresponding pulse is emitted from lidar system 200) or an angle of the input beam 235 (e.g., when an input signal is received by lidar system 200). In some implementations, the lidar system 200 determines an angular value based at least in part on a position of a component of the scanner 220. For example, an azimuth or altitude value associated with the pixel 264 may be determined from an angular position of one or more corresponding scanning mirrors of the scanner 220.

FIG. 4A illustrates an example vehicle 300 with a lidar system 302. The lidar system 302 includes a laser 310 with multiple sensor heads 312A-312D coupled to the laser 310 via multiple laser-sensor links 314. Each of the sensor heads 312 may include some or all of the components of the lidar system 200 illustrated in FIG. 2.

Each of the laser-sensor links 314 may include one or more optical links and/or one or more electrical links. The sensor heads 312 in FIG. 4A are positioned or oriented to provide a greater than 30-degree view of an environment around the vehicle. More generally, a lidar system with multiple sensor heads may provide a horizontal field of regard around a vehicle of approximately 30°, 45°, 60°, 90°, 120°, 180°, 270°, or 360°. Each of the sensor heads 312 may be attached to, or incorporated into, a bumper, fender, grill, side panel, spoiler, roof, headlight assembly, taillight assembly, rear-view mirror assembly, hood, trunk, window, or any other suitable part of the vehicle.

In the example of FIG. 4A, four sensor heads 312 are positioned at or near the four corners of the vehicle (e.g., each of the sensor heads 312 may be incorporated into a light assembly, side panel, bumper, or fender), and the laser 310 may be located within the vehicle 300 (e.g., in or near the trunk). The four sensor heads 312 may each provide a 90° to 120° horizontal field of regard (FOR), and the four sensor heads 312 may be oriented so that together they provide a complete 360-degree view around the vehicle. As another example, the lidar system 302 may include six sensor heads 312 positioned on or around the vehicle 300, where each of the sensor heads 312 provides a 60° to 90° horizontal FOR. As another example, the lidar system 302 may include eight sensor heads 312, and each of the sensor heads 312 may provide a 45° to 60° horizontal FOR. As yet another example, the lidar system 302 may include six sensor heads 312, where each of the sensor heads 312 provides a 70° horizontal FOR with an overlap between adjacent FORs of approximately 10°. As another example, the lidar system 302 may include two sensor heads 312 which together provide a forward-facing horizontal FOR of greater than or equal to 30°.

Data from each of the sensor heads 312 may be combined or stitched together to generate a point cloud that covers a greater than or equal to 30-degree horizontal view around a vehicle. For example, the laser 310 may include a controller or processor that receives data from each of the sensor heads 312 (e.g., via a corresponding electrical link 320) and processes the received data to construct a point cloud covering a 360-degree horizontal view around a vehicle or to determine distances to one or more targets. The point cloud or information from the point cloud may be provided to a vehicle controller 322 via a corresponding electrical, optical, or radio link 320. The vehicle controller 322 may include one or more CPUs, GPUs, and a non-transitory memory with persistent components (e.g., flash memory, an optical disk) and/or non-persistent components (e.g., RAM).

In some implementations, the point cloud is generated by combining data from each of the multiple sensor heads 312 at a controller included within the laser 310, and is provided to the vehicle controller 322. In other implementations, each of the sensor heads 312 includes a controller or processor that constructs a point cloud for a portion of the 360-degree horizontal view around the vehicle and provides the respective point cloud to the vehicle controller 322. The vehicle controller 322 then combines or stitches together the points clouds from the respective sensor heads 312 to construct a combined point cloud covering a 360-degree horizontal view. Still further, the vehicle controller 322 in some implementations communicates with a remote server to process point cloud data.

In any event, the vehicle 300 may be an autonomous vehicle where the vehicle controller 322 provides control signals to various components 330 within the vehicle 350 to maneuver and otherwise control operation of the vehicle 350. The components 330 are depicted in an expanded view in FIG. 4A for ease of illustration only. The components 330 may include an accelerator 340, brakes 342, a vehicle engine 344, a steering mechanism 346, lights 348 such as brake lights, head lights, reverse lights, emergency lights, etc., a gear selector 350, and/or other suitable components that effectuate and control movement of the vehicle 300. The gear selector 350 may include the park, reverse, neutral, drive gears, etc. Each of the components 330 may include an interface via which the component receives commands from the vehicle controller 322 such as "increase speed," "decrease speed," "turn left 5 degrees," "activate left turn signal," etc. and, in some cases, provides feedback to the vehicle controller 322.

In some implementations, the vehicle controller 322 receives point cloud data from the sensor heads 312 via the link 320 and analyzes the received point cloud data, using an SDCA (e.g., the SDCA 100 of FIG. 1) to sense or identify targets 230 (see FIG. 2) and their respective locations, distances, speeds, shapes, sizes, type of target (e.g., vehicle, human, tree, animal), etc. The vehicle controller 322 then provides control signals via the link 320 to the components 330 to control operation of the vehicle based on the analyzed information.

In addition to the lidar system 302, the vehicle 300 may also be equipped with other sensors such as a camera, a thermal imager, a conventional radar (none illustrated to avoid clutter), etc. The sensors can provide additional data to the vehicle controller 322 via wired or wireless communication links. Further, the vehicle 300 in an example implementation includes a microphone array operating as a part of an acoustic source localization system configured to determine sources of sounds.

Figure 4B:
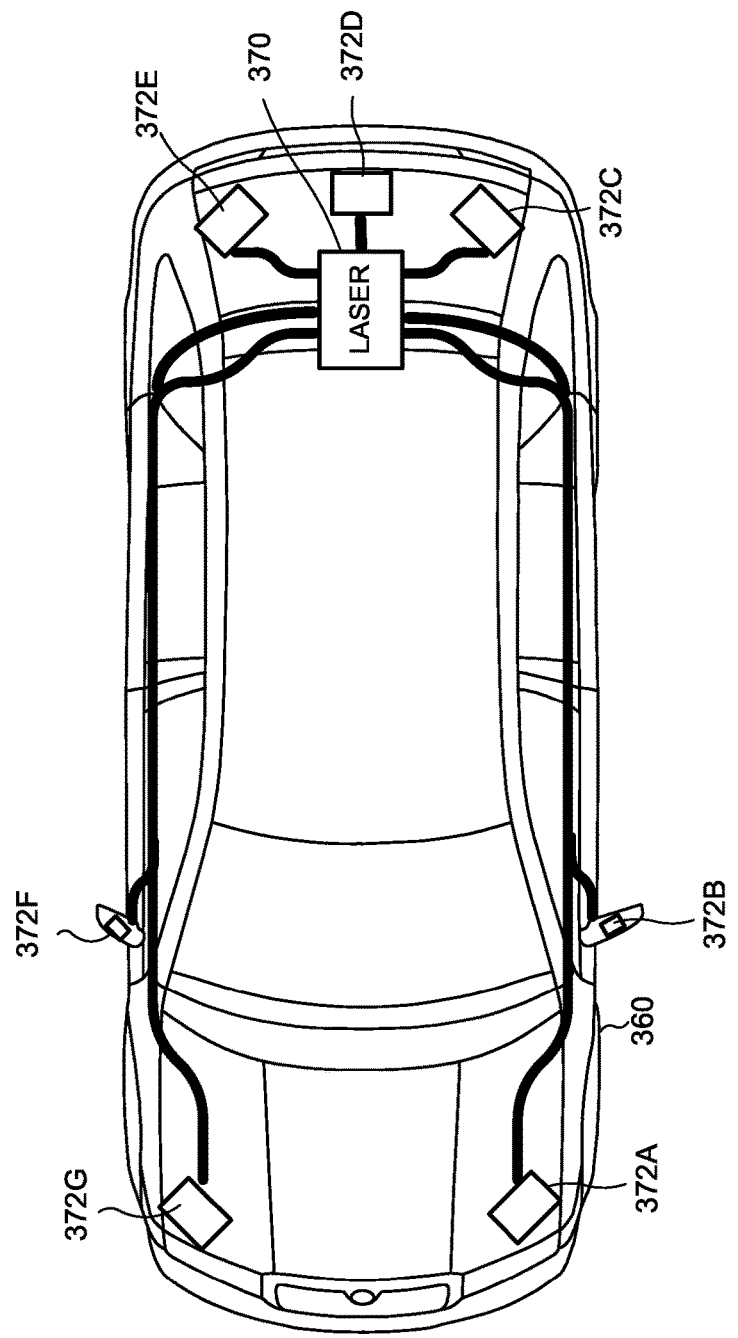
FIG. 4B illustrates another example vehicle in which the lidar system of FIG. 2 may operate, in accordance with some embodiments.

As another example, FIG. 4B illustrates a vehicle 360 in which a laser 370 is optically coupled to six sensor heads 372, each of which may be similar to one of the sensor heads 312 of FIG. 4A. The sensor heads 372A and 372G are disposed at the front of the hood, the sensor heads 372B and 372F are disposed in the side view mirrors, and the sensor heads 372C-E are disposed on the trunk. In particular, the sensor head 372D is oriented to face backward relative to the orientation of the vehicle 360, and the sensor heads 372C-E are oriented at approximately 45 degrees relative to the axis of orientation of the sensor head 372D.

Figure 5A:
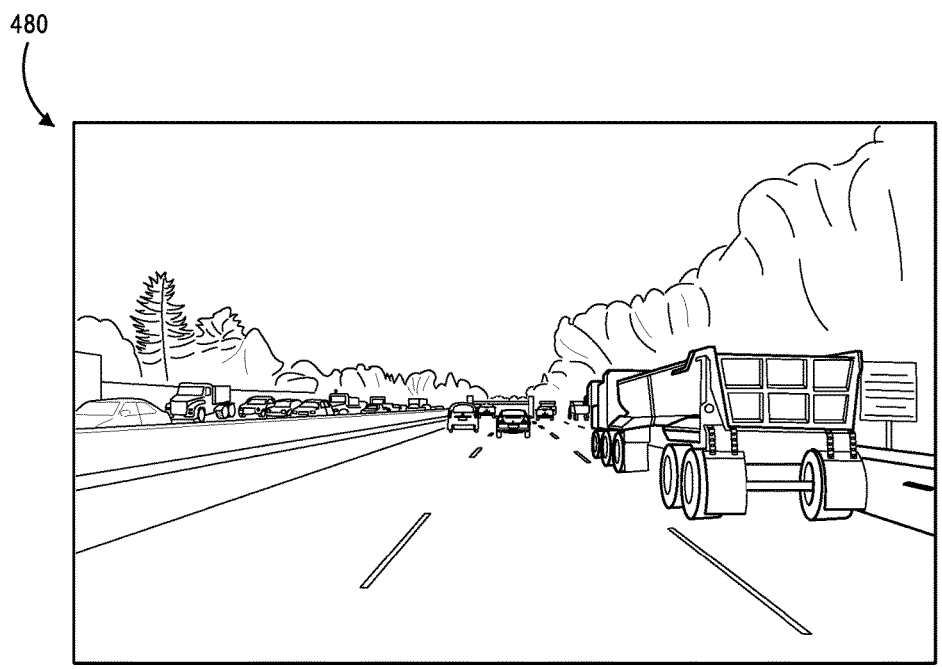
FIG. 5A illustrates an example environment in the direction of travel of an autonomous vehicle, in accordance with some embodiments.
Figure 5B:
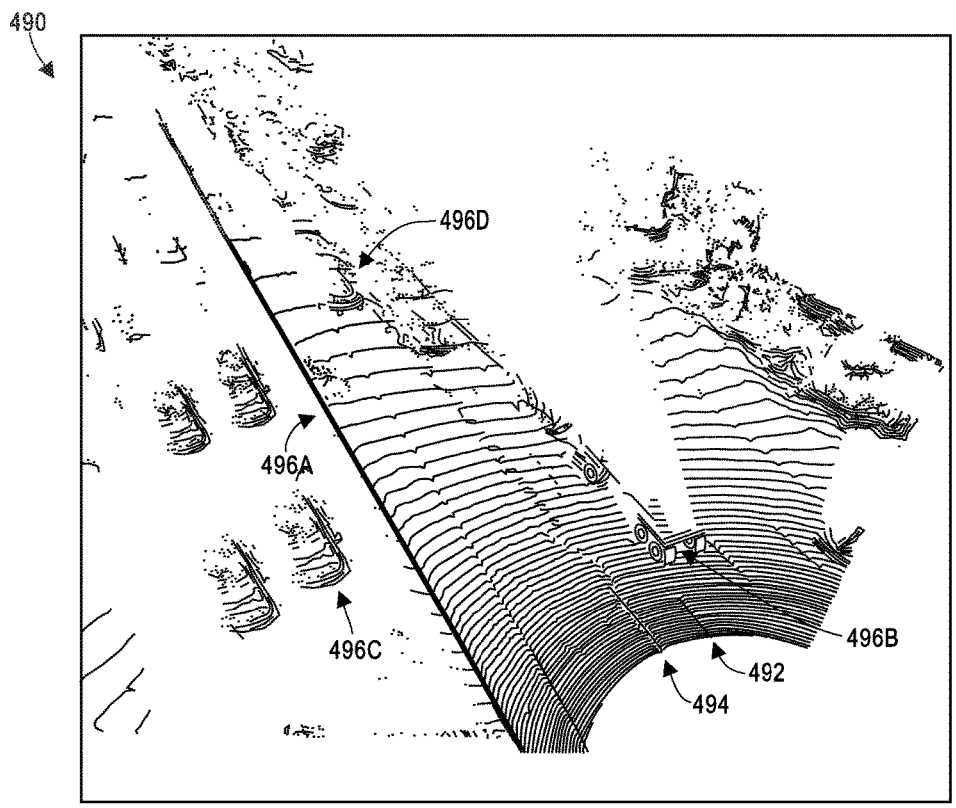
FIG. 5B illustrates an example point cloud that may be generated for the environment of FIG. 5A, in accordance with some embodiments.

FIG. 5A depicts an example real-world driving environment 480, and FIG. 5B depicts an example point cloud 490 that is generated by a lidar system scanning the environment 480 (e.g., the lidar system 200 of FIGS. 2 and 3 or the lidar system 302 of FIG. 4A). As seen in FIG. 5A, the environment 480 includes a highway with a median wall that divides the two directions of traffic, with multiple lanes in each direction. The point cloud 490 of FIG. 5B corresponds to an example embodiment in which two lidar devices each capture a roughly 60 degree horizontal field of regard, and in which the two fields of regard have a small overlap 492 (e.g., two or three degrees of overlap). The point cloud 490 may have been generated using the sensor heads 312A and 312D of FIG. 4A, or the sensor heads 372A and 372G of FIG. 4B, for example. While depicted as a visual image in FIG. 5B, it is understood that, in some embodiments, the point cloud 490 is not actually rendered or displayed at any time.

As seen in FIG. 5B, the point cloud 490 depicts a ground plane 494 (here, the road surface) as a number of substantially continuous scan lines, and also depicts, above the ground plane 494, a number of objects 496. For clarity, only a small number of the objects shown in FIG. 5B are labeled with a reference number. In embodiments, distinct ones of the objects 496 within the point cloud 490 may be identified by the segmentation module 110 as discussed with respect to FIG. 1. For example, the segmentation module 110 may detect substantial gaps and/or other discontinuities in the scan lines of the ground plane 494, and identify groups of points in the vicinity of those discontinuities as discrete objects. The segmentation module 110 may determine which points belong to the same object using any suitable rules, algorithms or models. Once the objects 496 are identified, the classification module 112 of FIG. 1 may attempt to classify the objects, and the tracking module 114 of FIG. 1 may attempt to track the classified objects (and, in some embodiments/scenarios, unclassified objects) across future point clouds similar to point cloud 490 (i.e., across multiple point cloud frames).

For various reasons, it may be more difficult for the segmentation module 110 to identify certain objects 496, and/or for the classification module 112 to classify certain objects 496, within the point cloud 490. As can be seen in FIG. 5B, for example, a median wall 496A may be relativity easy to identify and classify due to the high density of points as well as the "shadow" (i.e., absence or relative scarcity of points) that the wall 496A creates. A truck 496B may also be relatively easy to identify as an object, due to the high density of points (and possibly the shape of its shadow), but may not be as easy to classify due to the fact that large portions of the truck 496B are hidden within the lidar shadow. The vehicle 496C may be relatively easy to identify as an object, but may be more difficult to classify due to the lack of points within the lidar shadow created by the median wall 496A (i.e., along the lower portions of the vehicle 496C). The vehicle 496D may be more difficult to identify as a distinct object due to the scarcity of points at the greater distance from the autonomous vehicle, as well as the close proximity between the points corresponding to the vehicle 496D and points of other, nearby objects. Still other objects may be difficult to identify, classify and/or track due to their small size and/or low profile. For example, while not shown in FIG. 5B, the segmentation module 110 may identify (and the classification module 112 may classify) lane markings within the point cloud 490. The lane markings may appear as small but abrupt deviations in the path of the scan lines, for example, with those deviations collectively forming a line pattern that aligns with the direction of travel of the vehicle (e.g., approximately normal to the curve of the scan lines).

Despite such difficulties, the segmentation module 110, classification module 112 and/or tracking module 114 may use techniques that make object identification, classification and/or tracking highly accurate across a very wide range of scenarios, with scarce or otherwise suboptimal point cloud representations of objects. For example, the segmentation module 110, classification module 112 and/or tracking module 114 may include neural networks that were trained using data (e.g., manually labeled scenes) corresponding to a very large number of diverse environments/scenarios (e.g., with various types of objects at different distances, in different orientations, with different degrees of concealment, in different weather and/or lighting conditions, and so on).

Example Computing System for Controlling Vehicle Operation

Figure 6:
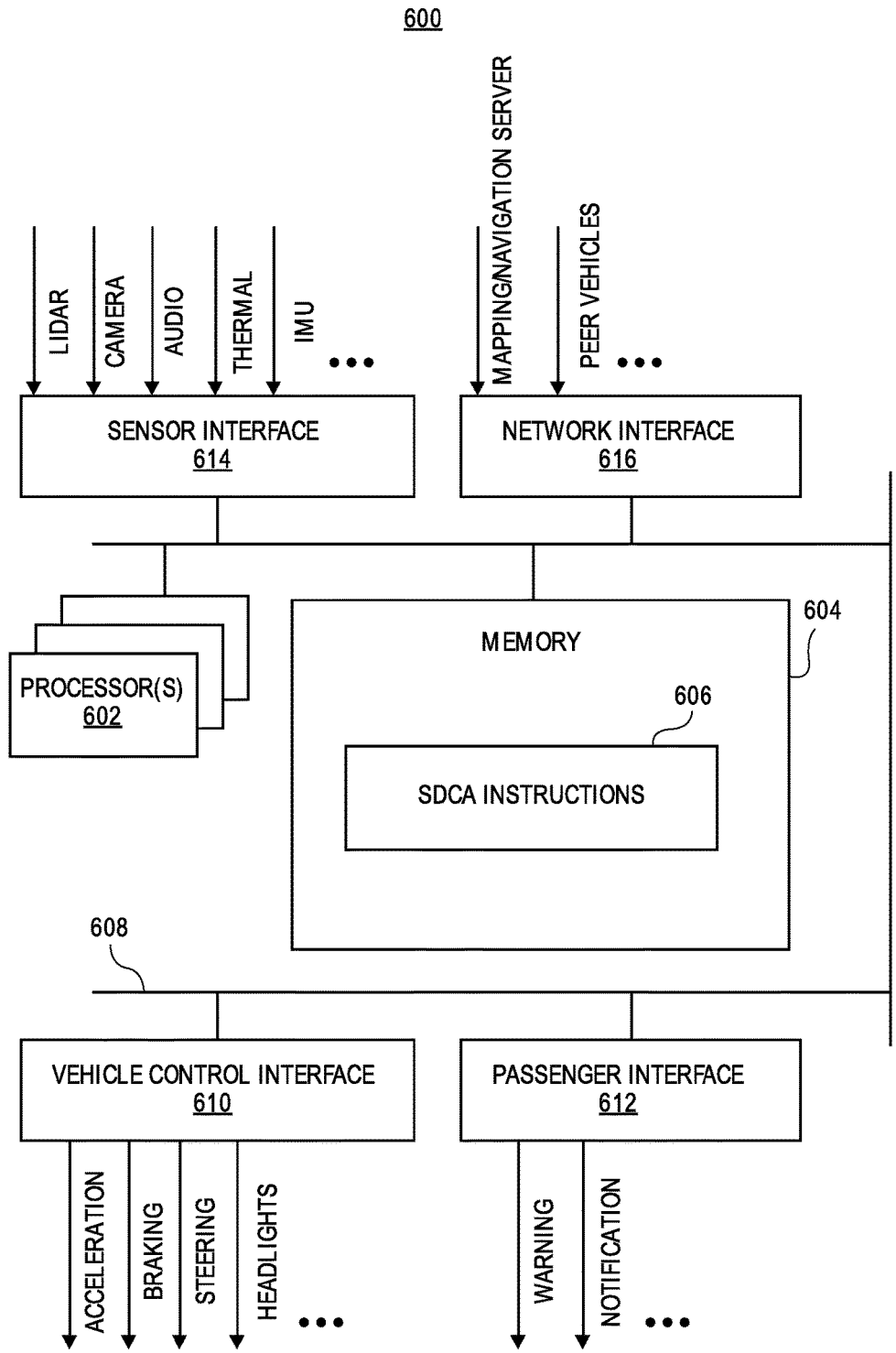
FIG. 6 is a block diagram of an example software architecture for controlling a self-driving vehicle, in accordance with some embodiments.

FIG. 6 is a block diagram of an example computing system 600 for controlling an autonomous vehicle. The computing system 600 may be integrated within an autonomous vehicle in any suitable manner, and at any suitable location or locations within the vehicle. The computing system 600 may be included, or partially included, within the vehicle controller 322 of FIG. 4A, for example. The computing system 600 includes one or more processors 602, and a memory 604 storing SDCA instructions 606. The SDCA instructions 606 may correspond to an SDCA such as the SDCA 100 of FIG. 1, for example.

In embodiments where the processor(s) 602 include more than a single processor, each processor may be a different programmable microprocessor that executes software instructions stored in the memory 604. Alternatively, each of the processor(s) 602 may be a different set of such microprocessors, or a set that includes one or more microprocessors and one or more other processor types (e.g., ASICs, FPGAs, etc.) for certain functions.

The memory 604 may include one or more physical memory devices with non-volatile memory. Any suitable memory type or types may be used, such as ROM, solid-state drives (SSDs), hard disk drives (HDDs), and so on. The processor(s) 602 are coupled to the memory 604 via a bus or other network 608. The network 608 may be a single wired network, or may include any suitable number of wired and/or wireless networks. For example, the network 608 may be or include a controller area network (CAN) bus, a Local Interconnect Network (LIN) bus, and so on.

Also coupled to the network 608 are a vehicle control interface 610, a passenger interface 612, a sensor interface 614, and a network interface 616. Each of the interfaces 610, 612, 614 and 616 may include one or more processors (e.g., ASICs, FPGAs, microprocessors, etc.) and/or other hardware, firmware and/or software to enable communication with systems, subsystems, devices, etc., that are external to the computing system 600.

The vehicle control interface 610 is generally configured to provide control data generated by the processor(s) 602 to the appropriate operational subsystems of the autonomous vehicle, such that the appropriate subsystems can effectuate driving decisions made by the processor(s) 602. For example, the vehicle control interface 610 may provide control signals to the appropriate subsystem(s) (e.g., accelerator 340, brakes 342, and steering mechanism 446 of FIG. 4A). As another example, the vehicle control interface 610 may provide the motion planner output (or maneuver executor output) to the appropriate subsystem(s). In some embodiments, the vehicle control interface 610 includes separate interface hardware, firmware and/or software for different operational subsystems.

The passenger interface 612 is generally configured to provide alerts, warnings, notifications, and/or other information to one or more passengers of the autonomous vehicle. In some embodiments where the vehicle is not fully autonomous (e.g., allowing human driving in certain modes and/or situations), the interface 612 may specifically provide such information to the driver (e.g., via dashboard indicators, etc.). As just one example, the passenger interface 612 may cause a display and/or speaker in the vehicle to generate an alert when the processor(s) 602 (executing the SDCA instructions 606) determine that a collision with another object is likely. As another example, the passenger interface 602 may cause a display in the vehicle to show an estimated time of arrival (ETA) to passengers. As an additional example, the passenger interface 612 may cause a display in the vehicle to show when a safe path plan is being followed and/or when a normal path plan is being followed. In some embodiments, the passenger interface 612 also permits certain user inputs. If the vehicle supports passenger selection of specific driving styles, for example, the passenger interface 812 may cause a display to present a virtual control (e.g., button) that a passenger may activate (e.g., touch, scroll through, etc.) to select a particular driving style.

The sensor interface 614 is generally configured to convert raw sensor data from one or more sensor devices (e.g., lidar, camera, microphones, thermal imaging units, IMUs, etc.) to a format that is consistent with a protocol of the network 608 and is recognized by one or more of the processor(s) 602. The sensor interface 614 may be coupled to the lidar system 200 of FIG. 2 or the lidar system 302 of FIG. 4A, for example, with the sensor interface 614 converting point cloud data to an appropriate format. In some embodiments, the sensor interface 614 includes separate interface hardware, firmware and/or software for each sensor device and/or each sensor type.

The network interface 616 is generally configured to convert data received from one or more devices or systems external to the autonomous vehicle to a format that is consistent with a protocol of the network 608 and is recognized by one or more of the processor(s) 602. In some embodiments, the network interface 616 includes separate interface hardware, firmware and/or software for different external sources. For example, a remote mapping/navigation server may send mapping and navigation/route data (e.g., mapping and navigation signals 132 of FIG. 1) to the computing system 600 via a cellular network interface of the network interface 616, while one or more peer vehicles (e.g., other autonomous vehicles) may send data (e.g., current positions of the other vehicles) to the computing system 600 via a WiFi network interface of the network interface 616. Other types of external data may also, or instead, be received via the network interface 616. For example, the computing system 600 may use the network interface 616 to receive data representing rules or regulations (e.g., speed limits), object positions (e.g., road rails, overhanging signage, etc.), and/or other information from various infrastructure devices or systems.

In some embodiments, no sensor data (or only limited sensor data) of the autonomous vehicle is received via the sensor interface 614. Instead, the processor(s) 602 may execute the SDCA instructions 606 using, as input, only (or primarily) data that is received by the network interface 616 from other vehicles, infrastructure, and/or other external devices/systems. In such an embodiment, the external data may include raw sensor data that is indicative of the vehicle environment (but was generated off-vehicle), and/or may include higher-level information that was generated externally using raw sensor data (e.g., occupancy grids).

The network 608 may also couple to other types of interfaces and/or components, and/or some of the interfaces shown in FIG. 6 may be omitted. Moreover, it is understood that the computing system 600 represents just one possible configuration for supporting the software architectures, functions, features, etc., described herein, and that others are also within the scope of this disclosure.

Example Diagram of Separate Path Plan Implementation

Figure 7:
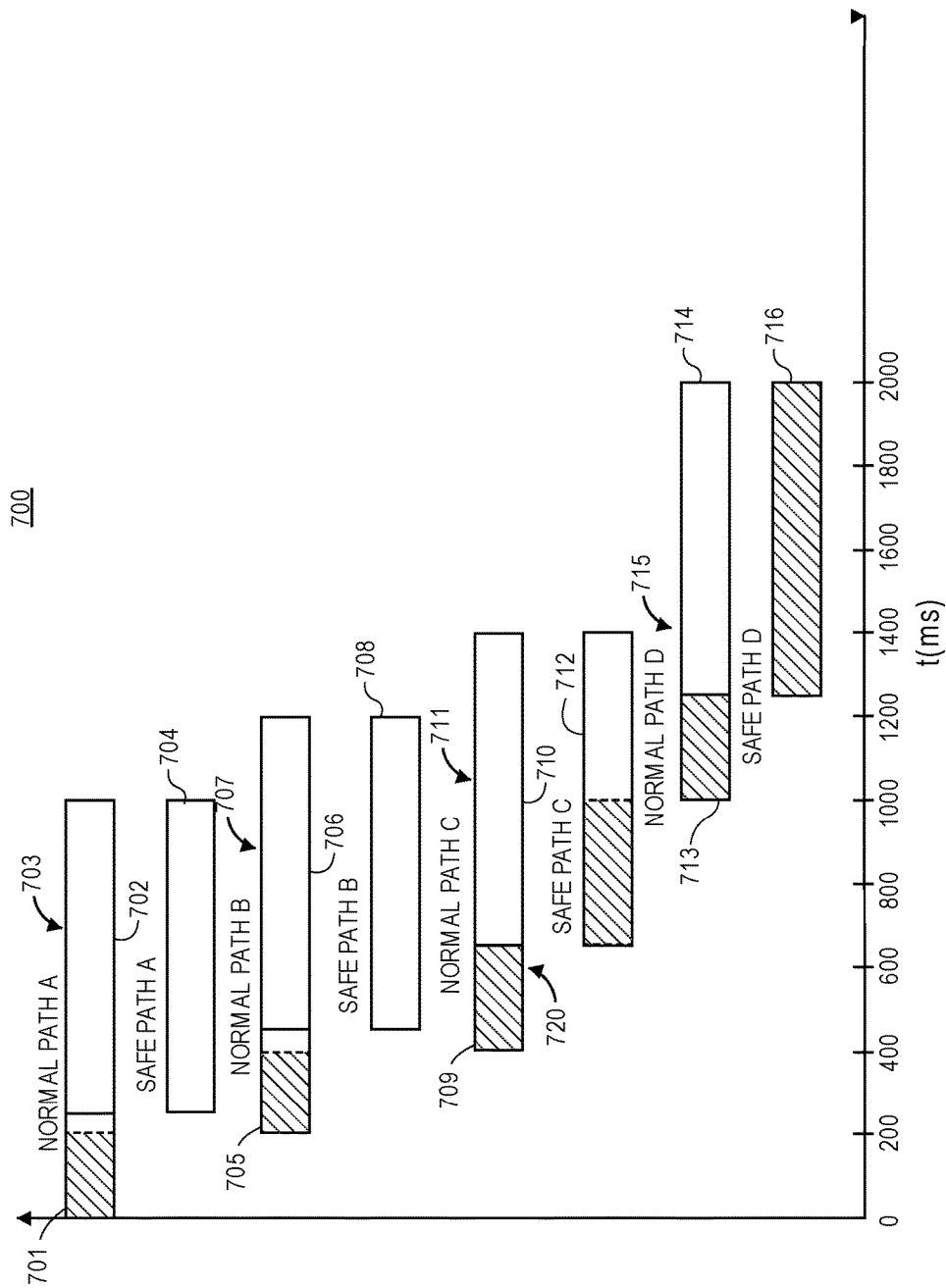
FIG. 7 is an example timing diagram of multiple separate path plans as a function of time, in accordance with some embodiments.

FIG. 7 depicts an example timing diagram 700 associated with the generation of separate normal path plans and safe path plans associated with operation of a vehicle. The path plans as depicted in FIG. 7 and as discussed herein may be generated by a computing system, such as the computing system 600 of FIG. 6 (e.g., by the processor(s) 602 when executing the instructions 606 stored in memory 604), or by another suitable computing device or system. The timing diagram 700 depicts successively generated path plans, where the horizontal axis represents time in milliseconds (ms). The locations of the path plans along the horizontal axis correspond to when the respective path plan is to be executed. The path plans are generated according to the separate path plan implementation, whereby the computing system concurrently (or in an implementation, sequentially) generates a normal path plan and a safe path plan by processing sensor and/or other data descriptive of a current state of an environment in which the vehicle is operating (e.g., in the SDCA 100 of FIG. 1, the perception signals 106, the prediction signals 122, and/or raw data generated by the sensors 102).

Generally, a normal path plan may represent continued or normal operation of the vehicle (e.g., such as to move the vehicle toward a specified destination), and the safe path plan may represent safe stoppage of the vehicle (e.g., such as to guide the vehicle to a roadside location and stop the vehicle). The safe path plan may consist of a set of motion primitives that may be concatenated together, as further discussed with reference to FIG. 9. The computing device may generate each of the normal path plan and the safe path plan by processing sensor and/or other data descriptive of a current state of an environment in which the vehicle is operating (e.g., in the SDCA 100 of FIG. 1, the perception signals 106, the prediction signals 122, and/or raw data generated by the sensors 102).

As depicted in the timing diagram 700, the computing device may, at time 0 ms (or another time), generate a normal path plan A 703 and a safe path plan A 704, each of which may correspond to a set time period or window. The computing device may generate the normal path plan A 703 and the safe path plan A 704 based on a set of signals descriptive of a current state of an environment in which the vehicle is operating, as noted above. In embodiments, the time period of the normal path plan A 703 may be the same as or different from the time period of the safe path plan A 704. For example, as shown in FIG. 7, the time period of the normal path plan A 703 is 1000 ms and the time period of the safe path plan A 704 is 750 ms.

The normal path plan A 703 may consist of an initial portion 701 and a remainder portion 702, where the initial portion 701 may occupy a first set period of time and the remainder portion 702 may occupy a second set period of time. In embodiments, the length of the first set period of time may be the same as or different from the length of the second set period of time. For example, as shown in FIG. 7, the initial portion 701 may occupy 250 ms and the remainder portion 702 may occupy 750 ms. As shown in FIG. 7, the normal path plan A 703 is generated to be executed at time 0 ms and the safe path plan A 704 is generated to be executed, in some situations, at time 250 ms (i.e., upon expiration of the initial portion 701).

Prior to expiration of the initial portion 701 of the normal path plan A 703 (i.e., prior to 250 ms), the computing device may access an updated set of signals descriptive of an updated current state of the environment in which the vehicle is operating, and may generate a normal path plan B 707 and a safe path plan B 708 based on the updated set of signals, each of which may correspond to a set time period or window. For example, the computing device may access the updated set of signals and generate the normal path plan B 707 and the safe path plan B 708 at time 200 ms. In embodiments, the time period of the normal path plan B 707 may be the same as or different from the time period of the safe path plan B 708. For example, as shown in FIG. 7, the time period of the normal path plan B 707 is 1000 ms and the time period of the safe path plan B 708 is 750 ms.

The normal path plan B 707 may consist of an initial portion 705 and a remainder portion 706, where the initial portion 705 may occupy a first set period of time and the remainder portion 706 may occupy a second set period of time. In embodiments, the length of the first set period of time may be the same as or different from the length of the second set period of time. For example, as shown in FIG. 7, the initial portion 705 may occupy 250 ms and the remainder portion 706 may occupy 750 ms. As shown in FIG. 7, the normal path plan B 707 is generated to be executed at time 200 ms and the safe path plan B 708 is generated to be executed, in some situations, at time 450 ms (i.e., upon expiration of the initial portion 705).

In operation, after generating the normal path plan B 707, the computing device may cease execution of the normal path plan A 703, and may initiate execution of the normal path plan B 707. For example, the computing device may cease execution of the normal path plan A 703 and initiate execution of the normal path plan B 707 at time 200 ms, where the initial portion 705 may expire at 450 ms. As a result, the computing device does not execute the last 50 ms of the initial portion 701 of the normal path plan A 703, the remainder portion 702 of the normal path plan A 703, or the safe path plan A 704. FIG. 7 depicts the portion of the normal path plan A 703 that is executed as hatched.

Prior to expiration of the initial portion 705 of the normal path plan B 707 (i.e., prior to 450 ms), the computing device may access an updated set of signals descriptive of an updated current state of the environment in which the vehicle is operating, and may generate a normal path plan C 711 and a safe path plan C 712, each of which may correspond to a set time period or window. For example, the computing device may access the updated set of signals and generate the normal path plan C 711 and the safe path plan C 712 at time 400 ms. In embodiments, the length of the time period of the normal path plan C 711 may be the same as or different from the length of the time period of the safe path plan C 712. For example, as shown in FIG. 7, the time period of the normal path plan C 711 is 1000 ms and the time period of the safe path plan C 712 is 750 ms.

The normal path plan C 711 may consist of an initial portion 709 and a remainder portion 710, where the initial portion 709 may occupy a first set period of time and the remainder portion 710 may occupy a second set period of time. In embodiments, the length of the first set period of time may be the same as or different from the length of the second set period of time. For example, as shown in FIG. 7, the initial portion 709 may occupy 250 ms and the remainder portion 710 may occupy 750 ms. As shown in FIG. 7, the normal path plan C 711 is generated to be executed at time 400 ms and the safe path plan C 712 is generated to be executed, in some situations, at time 650 ms (i.e., upon expiration of the initial portion 709).

In operation, after generating the normal path plan C 711, the computing device may cease execution of the normal path plan B 707, and may initiate execution of the normal path plan C 711. For example, the computing device may cease execution of the normal path plan B 707 and initiate execution of the normal path plan C 711 at time 400 ms, where the initial portion 711 may expire at 650 ms. As a result, the computing device does not execute the last 50 ms of the initial portion 705 of the normal path plan B 707, the remainder portion 706 of the normal path plan B 707, or the safe path plan B 708. FIG. 7 depicts the portion of the normal path plan B 707 that is executed as hatched.

Prior to or upon expiration of the initial portion 709 of the normal path plan C 711, the computing device may attempt to access and/or process updated sensor data to generate an additional normal path plan and an additional safe path plan. However, one or more fault conditions may occur in which safe stoppage of the vehicle may be preferred or deemed safer than continued normal operation of the vehicle. The occurrence of the fault condition, as referenced by 720 in FIG. 7, occurs at time 650 ms.

Generally, a fault condition may occur at any time and in one or more different ways. In an embodiment, a fault condition may occur when the computing device does not have access to a requisite amount of sensor data to accurately assess the vehicle environment. In another embodiment, a fault condition may occur when one or more components of the control architecture is not functioning correctly. In a further embodiment, a fault condition may occur when the computing device generates a set of path plans, but one or more of the path plans is malformatted or contains one or more errors. It should be appreciated that alternative or additional fault conditions are envisioned.

A fault condition may thus result in the computing device not generating an additional path plan(s) (or in some cases, generating a malformatted path plan, an error message, or the like) within the initial portion 709 of the normal path plan C 711 (i.e., prior to 650 ms). In the event of a fault condition during (or at the expiration of) the initial portion 709 of the normal path plan C 711, the computing device may execute any remainder of the initial portion 709 to time 650 ms, and automatically transition to executing the safe path plan C 712 at time 650 ms. Thus, the vehicle may operate to a safe stopping location in accordance with the safe path plan C 712 even when any of the upstream components of the control architecture fail. FIG. 7 depicts the execution of the initial portion 709 and the safe path plan C 712 as hatched.

In some situations, the fault condition may cease during execution of a safe path plan (i.e., there may no longer be a fault condition), or functionality of the computing system may otherwise return to normal. For example, as depicted in FIG. 7, the computing device may access and process an updated set of signals descriptive of a current state of the environment at time 1000 ms, and may accordingly generate a normal path plan D 715 and a safe path plan D 716, where the normal path plan D 715 may consist of an initial portion 713 occupying a first set period of time and a remainder portion 714 occupying a second set period of time.

In this scenario, at time 1000 ms, the computing device may transition from executing the safe path plan C 712 to initiate execution of the normal path plan D 715 to cause the vehicle to move according to the normal path plan D 715. Accordingly, the vehicle may cease safe stoppage operation and may return to normal operation. The functionalities associated with periodically generating updated separate path plans may continue indefinitely until a fault condition is detected, the vehicle is stopped, or another condition occurs. In the situation depicted in FIG. 7, the computing device executes the initial portion 713 of the normal path plan D 715 to time 1250 ms, and then executes the safe path plan D 716 from time 1250 ms to time 2000 ms, as depicted in FIG. 7 as hatched.

Example Diagram of Hybrid Path Plan Implementation

Figure 8:
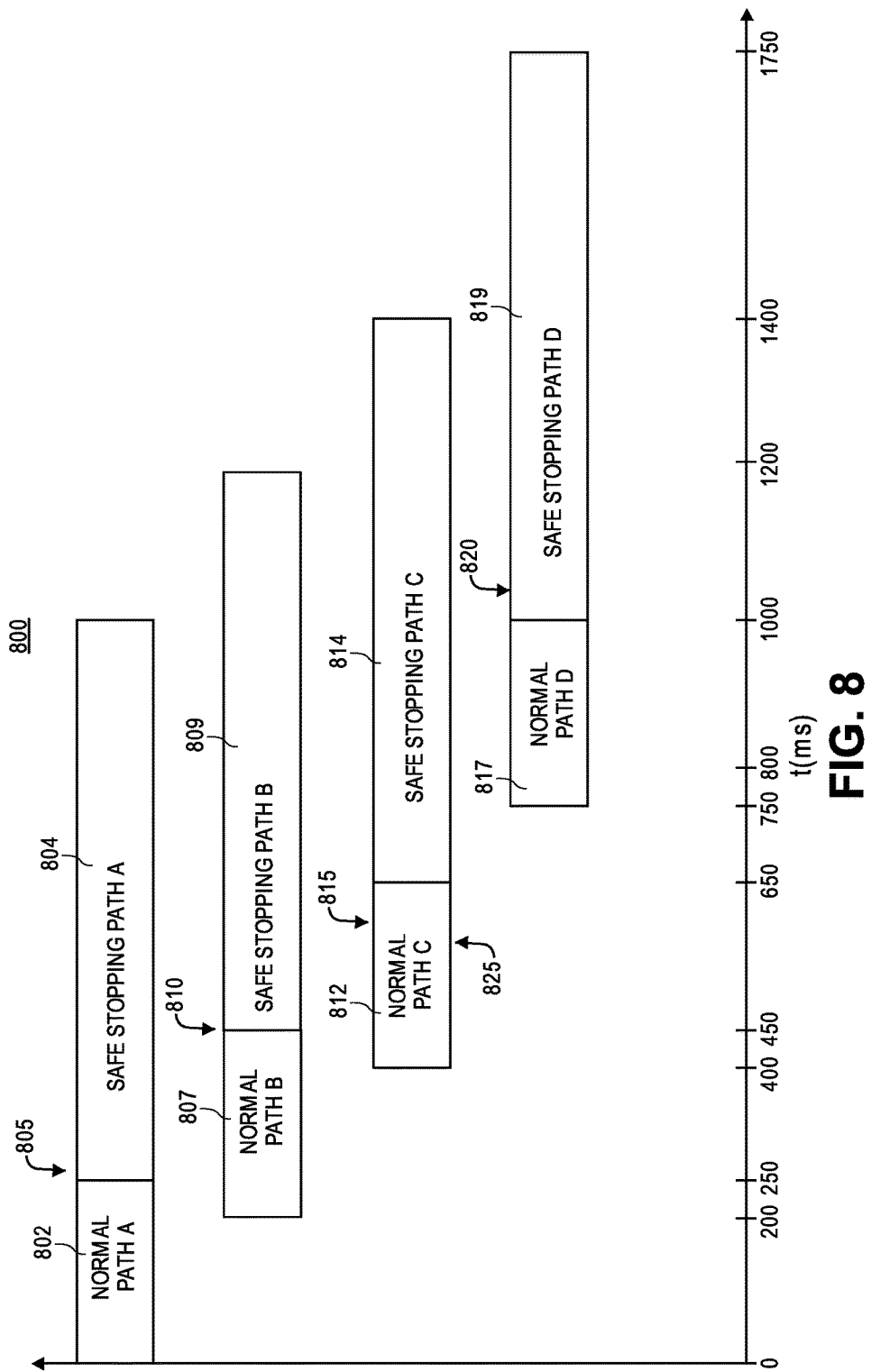
FIG. 8 is an example timing diagram of multiple hybrid path plans as a function of time, in accordance with some embodiments.

FIG. 8 depicts an example timing diagram 800 associated with the generation of a hybrid normal path plan and safe path plan associated with operation of a vehicle. The hybrid path plans as depicted in FIG. 8 and as discussed herein may be generated by a computing system, such as the computing system 600 of FIG. 6 (e.g., by the processor(s) 602 when executing the instructions 606 stored in memory 604), or by another suitable computing device or system. The timing diagram 800 depicts successively generated hybrid path plans, where the horizontal axis represents time in milliseconds (ms). The hybrid path plans are generated according to the hybrid path plan implementation, whereby the computing system serially generates hybrid path plans.

Generally, a hybrid path plan includes a normal path plan which may represent continued or normal operation of the vehicle (e.g., such as to move the vehicle toward a specified destination), and a safe path plan which may represent safe stoppage of the vehicle (e.g., such as to guide the vehicle to a roadside location and stop the vehicle). The computing device may generate the hybrid path plan (i.e., the normal path plan and safe path plan components thereof) by processing sensor and/or other data descriptive of a current state of an environment in which the vehicle is operating (e.g., in the SDCA 100 of FIG. 1, the perception signals 106, the prediction signals 122, and/or raw data generated by the sensors 102).

As depicted in the timing diagram 800, the computing device may, at time 0 ms, generate a hybrid path plan A 805 having a time period and comprising a normal path plan A 802 and a safe path plan A 804. According to embodiments, the computing device may generate the hybrid path plan A 805 based on a set of signals descriptive of a current state of an environment in which the autonomous vehicle is operating, as noted above. The normal path plan A 802 occupies an initial portion of the time period and the safe path plan A 804 occupies a subsequent portion of the time period. For example, the time period of the hybrid path plan A 805 may be one (1) second, the initial portion of the time period may be the initial 250 ms, and the subsequent portion of the time period may be the subsequent 750 ms. In embodiments, the length of the time period of the initial portion may be the same as or different from that of the subsequent portion. After generating the hybrid path plan A 805, the computing device may initiate execution of the hybrid path plan A 805 (i.e., at time 0 ms) to cause the vehicle, during the initial portion, to move according to the normal path plan A 802.

Prior to expiration of the normal path plan A 802 (i.e., prior to 250 ms), the computing device may access an updated set of signals descriptive of an updated current state of the environment in which the vehicle is operating, and generate a hybrid path plan B 810 having a time period and comprising a normal path plan B 807 and a safe path plan B 809. According to embodiments, the computing device may generate the hybrid path plan B 810 based on processing the updated set of signals descriptive of the updated current state of the environment in which the autonomous vehicle is operating, where the updated set of signals may be generated and accessed prior to time 250 ms. For example, the computing device may generate and access the updated set of signals, and may generate the hybrid path plan B 810 at or around time 200 ms.

The length of the time period of the hybrid path plan B 810 may be the same as or different from the length of the time period of the hybrid path plan A 805. The normal path plan B 807 may occupy an initial portion of the time period and the safe path plan B 809 may occupy a subsequent portion of the time period. For example, the time period of the hybrid path plan B 810 may be one (1) second, the initial portion of the time period may be the initial 250 ms, and the subsequent portion of the time period may be the subsequent 750 ms. In embodiments, the length of the time period of the initial portion may be the same as or different from that of the subsequent portion.

After generating the hybrid path plan B 810, the computing device may cease executing the hybrid path plan A 805 and may instead initiate execution of the hybrid path plan B 810 to cause the vehicle, during the initial portion, to move according to the normal path plan B 807. For example, as shown in FIG. 8, the computing device may cease executing the hybrid path plan A 805 and may instead initiate execution of the hybrid path plan B 810 at time 200 ms.

Prior to expiration of the normal path plan B 807 (i.e., prior to 450 ms), the computing device may access an updated set of signals descriptive of an updated current state of the environment in which the vehicle is operating, and generate a hybrid path plan C 815 having a time period and comprising a normal path plan C 812 and a safe path plan C 814. According to embodiments, the computing device may generate the hybrid path plan C 815 based on processing the updated set of signals descriptive of the updated state of the environment in which the autonomous vehicle is operating, where the updated set of signals may be generated and accessed prior to time 450 ms. For example, the computing device may generate and access the updated set of signals, and may generate the hybrid path plan C 815 at or around time 400 ms.

The length of the time period of the hybrid path plan C 815 may be the same as or different from the length of the time period of each of the hybrid path plan A 805 and the hybrid path plan B 810. The normal path plan C 812 may occupy an initial portion of the time period and the safe path plan C 814 may occupy a subsequent portion of the time period. For example, the time period of the hybrid path plan C 810 may be one (1) second, the initial portion of the time period may be the initial 250 ms, and the subsequent portion of the time period may be the subsequent 750 ms. In embodiments, the length of the time period of the initial portion may be the same as or different from that of the subsequent portion.

After generating the hybrid path plan C 815, the computing device may cease executing the hybrid path plan B 810 and may instead initiate execution of the hybrid path plan C 815 to cause the vehicle, during the initial portion, to move according to the normal path plan C 812. For example, as shown in FIG. 8, the computing device may cease executing the hybrid path plan B 810 and may instead initiate execution of the hybrid path plan C 815 at time 400 ms.

Prior to or upon expiration of the normal path plan C 812, the computing device may attempt to access and process a set of updated set of signals to generate an additional hybrid path plan comprising an additional normal path plan and an additional safe path plan. However, one or more fault conditions may occur in which safe stoppage of the vehicle may be preferred or deemed safer than continued normal operation of the vehicle. The occurrence of the fault condition, as referenced by 825 in FIG. 8, occurs at time 650 ms.

Generally, a fault condition may occur at any time and in one or more different ways. In an embodiment, a fault condition may occur when the computing device does not have access to a requisite amount of sensor data to accurately assess the vehicle environment. In another embodiment, a fault condition may occur when one or more components of the control architecture is not functioning correctly. In a further embodiment, a fault condition may occur when the computing device generates a set of path plans, but one or more of the path plans is malformatted or contains one or more errors. It should be appreciated that alternative or additional fault conditions are envisioned.

A fault condition may thus result in the computing device not generating an additional hybrid path plan(s) (or in some cases, generating a malformatted path plan, an error message, or the like) within the initial portion corresponding to the normal path plan C 812 (i.e., prior to 650 ms). In the event of a fault condition during (or at the expiration of) the initial portion corresponding to the normal path plan C 812, the computing device may automatically transition to executing the safe path plan C 814 to cause the vehicle to follow the safe path plan C 814. In particular, the computing device may execute the normal path plan C 812 from time 400 ms to time 650 ms, and execute the safe path plan C 814 from time 650 ms to time 1400 ms. Therefore, after the computing device executes the safe path plan C 814 (at time 1400 ms), the vehicle may be safely stopped.

In embodiments, the fault condition may cease during execution of a safe stopping path (i.e., there may no longer be a fault condition), or functionality of the computing system may otherwise return to normal. For example, as depicted in FIG. 8, the computing device may access and process an updated set of signals descriptive of a current state of the environment at time 750 ms, and may accordingly generate a hybrid path plan D 820 having a time period and comprising a normal path plan D 817 and a safe path plan D 819. Similar to the other hybrid path plans 805, 810, 815, the normal path plan D 817 may occupy an initial portion of the time period and the safe path plan D 819 may occupy a subsequent portion of the time period.

In this scenario, at time 750 ms, the computing device may transition from executing the safe path plan C 814 to initiate execution of the hybrid path plan D 820 to cause the vehicle, during the initial portion, to move according to the normal path plan D 817. Accordingly, the vehicle may cease safe stoppage operation and may return to normal operation. The functionalities associated with periodically generating updated hybrid path plans may continue indefinitely until a fault condition is detected, the vehicle is stopped, or another condition occurs.

Example Diagram of Motion Primitives

In generating a path plan such as a safe path plan (e.g., according to one of the above embodiments, or in an embodiment where safe path plans are only generated upon detecting a sensor failure, etc.), the control architecture may determine a sequence of individual movements or "motion primitives" for the autonomous vehicle to execute. According to some embodiments, each motion primitive may represent an approximation of a straight path line segment on which to move the autonomous vehicle. The control architecture may determine the sequence of motion primitives based on a combination of factors, such as current sensor data indicative of the environment in which the autonomous vehicle is operating (including any detected additional vehicles, lanes markings, etc.), the roadway position of the autonomous vehicle, the roadway position(s) of an additional vehicle(s) in a vicinity of the autonomous vehicle, a lapse of time since a recent sensor data access, and/or potential safe pullover locations to which the autonomous vehicle may be directed.

The set of motion primitives as discussed herein may be generated by a computing system, such as the computing system 600 of FIG. 6 (e.g., by the processor(s) 602 when executing the instructions 606 stored in memory 604), or by another suitable computing device or system. In generating the set of motion primitives, the computing system may account for a feasibility of the vehicle to stop safely, including a set of safety variables, and an uncertainty associated with future movements of nearby vehicles, pedestrians, and/or the like. According to embodiments, the set of safety variables may affect the ability of the vehicle to stop safely, and may include one or more the following examples: a velocity of the vehicle, an availability of sensor data, an ability to provide warnings to nearby vehicles and pedestrians, status of traffic signals, a lapse of time (i.e., the longer to wait before generating the motion primitives, the more unsafe), a vehicle position relative to an stopping location, road conditions, traffic conditions, weather conditions, a probability of accident, a feasibility of the path included in the motion primitives, and dynamics of the vehicle. It should be appreciated that alternative and additional safety variables are envisioned.

For example, as the velocity of the autonomous vehicle increases, the computing system may allow for a greater distance for the autonomous vehicle to switch lanes and a greater amount of time needed for the autonomous vehicle to slow down. The computing system may account for certain risks associated with operation of the autonomous vehicle when determining the set of motion primitives. Depending on the sensed environment of the vehicle, for example, there may be certain risks associated with executing a stopping or pull-over maneuver too quickly (e.g., veering into a nearby vehicle or getting rear-ended), and certain other risks associated with taking too long to execute a pull-over maneuver (e.g., resulting from the deteriorating ability to predict states of the environment further into the future).

Generally, the computing device may determine and generate a set of motion primitives based on a set of signals (or most recently available set of signals) descriptive of a current state of an environment in which the autonomous vehicle is operating, and a weighting of these safety and uncertainty factors or variables, with a general goal to safely stop the vehicle while minimizing risks associated with stopping the vehicle. It should be appreciated that the computing device may weigh the safety and uncertainty factors or variables differently, and may periodically or dynamically adjust the weights based on the situation. For example, the computing device may weigh a road condition variable higher if the roadway is icy versus when the roadway is not icy. As a further example, the computing device may weigh an uncertainty factor higher as the amount of additional vehicles present within a vicinity of the vehicle increases.

In determining and generating the set of motion primitives, the computing device may account for a set of rules that generally dictate what may be considered "normal" traffic flow. In particular, one of the rules may be traffic laws or rules of the road that may be applicable in a location of the autonomous vehicle. In one implementation, the computing device may determine the set of motion primitives with the goal of safely stopping the autonomous vehicle, irrespective of one or more of the traffic laws in the applicable location. For example, the computing device may determine a set of motion primitives that serves to pull the autonomous vehicle over to and stop on a shoulder of a roadway, even though an applicable traffic law does not allow vehicles to pull over on the shoulder of the roadway. In another implementation, the computing device may determine the set of motion primitives with the goals of safely stopping the autonomous vehicle while complying with the traffic laws in the applicable location.

Each motion primitive may represent a single movement to be undertaken by the vehicle. A set of motion primitives may, in totality, reflect a set of movements to be undertaken by the vehicle with the intention of safely stopping the vehicle. The computing device may determine each motion primitive individually, and may concatenate the determined motion primitives to be executed sequentially. Accordingly, the concatenated motion primitives may represent a safe path plan for the vehicle (e.g., one or more of the safe path plans shown in FIG. 7 or 8). The computing device may determine and assign an execution time for each of the motion primitives based on the velocity of the autonomous vehicle and/or other factors.

In embodiments, the set of motion primitives may be set or predetermined. For example, the set of motion primitives may include a "continue straight" motion primitive (e.g., stay on the current course, a "turn left" and a "turn right" motion primitive (e.g., execute a 90-degree turn), a "gradual turn left" and a "gradual turn right" motion primitive (veer to the left or right gradually; e.g., follow a hyperbolic tangent path), a "rapid left turn" and a "rapid right turn" motion primitive (e.g., swerve to avoid an obstacle), and a "change velocity" motion primitive (e.g., gradually come to a stop, gradually speed up, or execute a sudden stop). It should be appreciated that alternative and additional motion primitives are envisioned.

Additionally, each motion primitive of the set of motion primitives may have a time scale or time period associated therewith (e.g., 100 ms, 200 ms, 500 ms, 1000 ms, etc.). Generally, a time period may be hard-coded to a corresponding motion primitive, or a time period may be a variable parameter that is assigned to a motion primitive when a set of motion primitives (e.g., a set of motion primitives to safely stop a vehicle) is determined.

Figure 9:
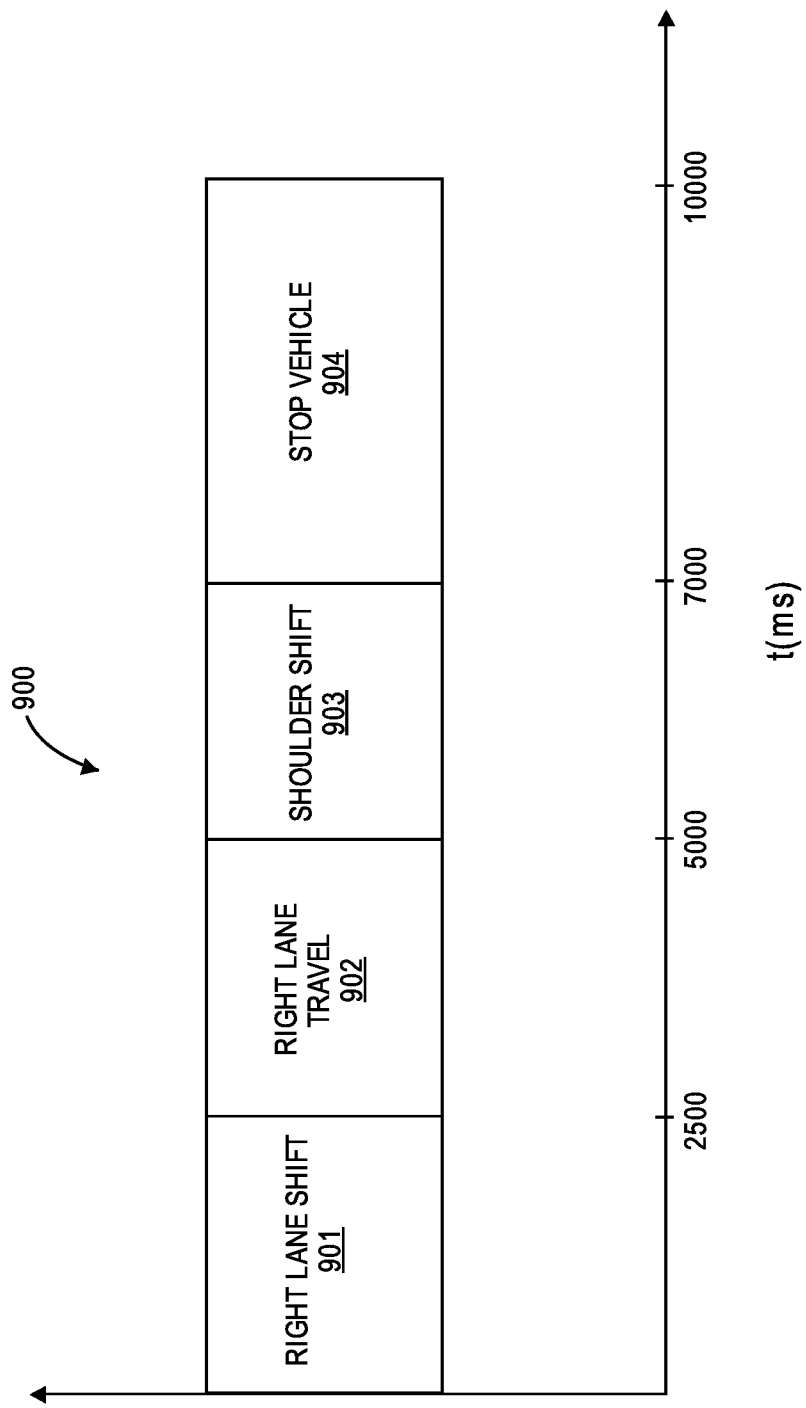
FIG. 9 is an example timing diagram of a path plan having a plurality of motion primitives, in accordance with some embodiments.

FIG. 9 depicts an example set of motion primitives that may be concatenated together to form a safe path plan 900 for a vehicle (e.g., one of the safe path plans shown in FIG. 7 or 8). According to embodiments, the set of motion primitives may be generated by a computing device based on a set of signals descriptive of a current state of an environment in which the autonomous vehicle is operating, as well as any uncertainty or risk factors, variables, and/or rules, as discussed herein.

As depicted in FIG. 9, the safe path plan 900 may include four (4) individual motion primitives. As an example, it may be assumed that the autonomous vehicle is traveling in the middle lane of a 3-lane highway, where the right shoulder of the highway may be considered a safe pullover location. Accordingly, the safe stopping path 900 includes a first motion primitive 901 for a right lane shift (i.e., shifting from the middle lane to the right lane), a second motion primitive 902 for a right lane travel (i.e., traveling a distance in the right lane), a third motion primitive 903 for a shoulder shift (i.e., shifting from the right lane to the shoulder), and a fourth motion primitive 904 for a vehicle coming to a stop.

The safe path plan 900 may have a total time period (as shown: 10,000 ms), where each motion primitive may have an individual time period, and where the individual time periods may vary. For example, the first motion primitive 901 for the right lane shift may be 2,500 ms and the third motion primitive 903 for the shoulder shift may be 2,000 ms, such as to allow the vehicle more time to switch from the center lane to the right lane than to switch from the right lane to the shoulder. In operation, the computing device may sequentially execute the four (4) motion primitives, thereby executing the safe path plan to cause the autonomous vehicle to transition from traveling in the middle lane to stopping on the shoulder.

Example Flow Diagrams for Managing Operation of Autonomous Vehicles

Figure 10:
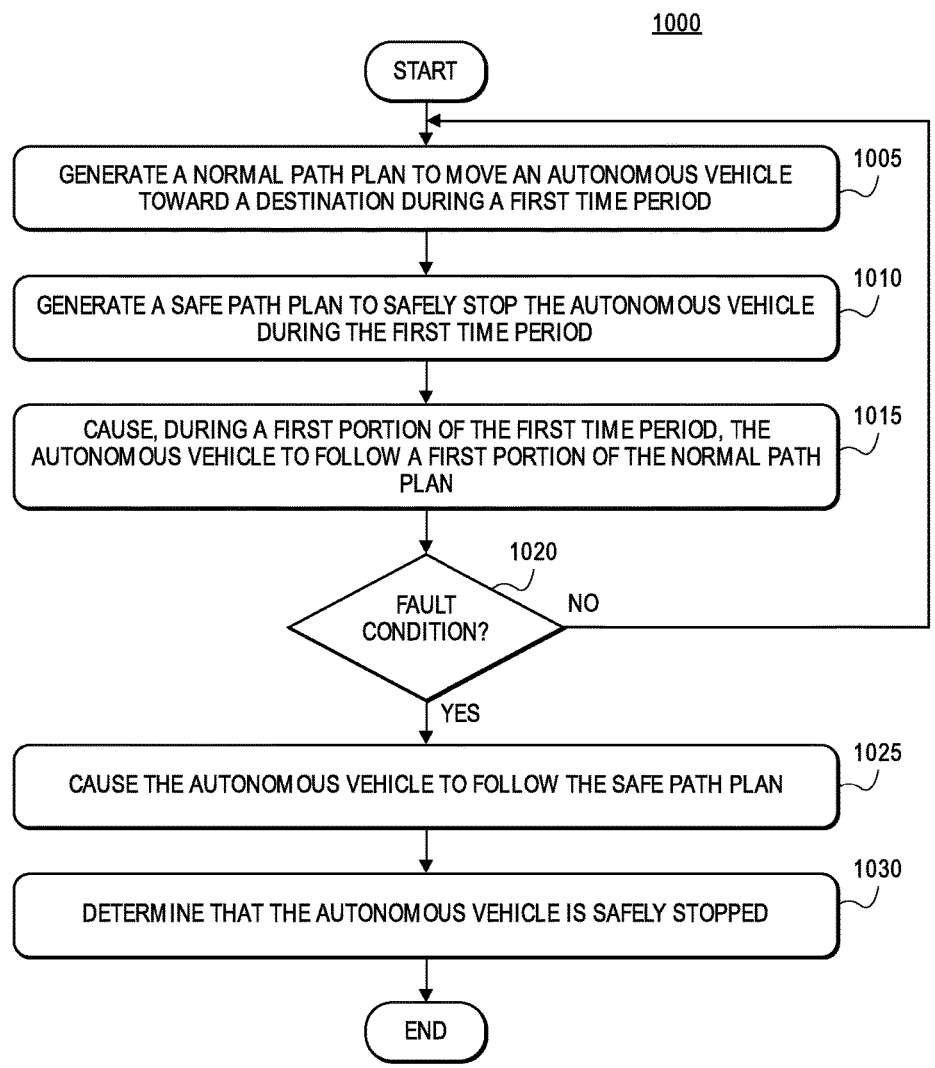
FIG. 10 is a flow diagram of an example method of managing operation of an autonomous vehicle moving toward a destination, in accordance with some embodiments.

FIG. 10 depicts an example method 1000 for managing operation of an autonomous vehicle moving toward a destination. The method 1000 may be implemented and performed by the computing system 600 of FIG. 6 (e.g., by the processor(s) 602 when executing the instructions 606 stored in memory 604), for example, or by another suitable computing device or system.

The method 1000 may begin when the computing system generates (block 1005) a normal path plan to move the autonomous vehicle toward the destination during a first period of time. The computing system may generate the normal path plan by one or more processors processing a set of signals descriptive of a current state of an environment in which the autonomous vehicle is operating.

The computing system may further generate (block 1010) a safe path plan to safely stop the autonomous vehicle during the first time period, where the one or more processors may generate the safe path plan based on processing the set of signals. In this regard, the computing system may concurrently (or sequentially) generate the normal path plan and the safe path plan. The computing system may cause (1015), during a first portion of the first time period, the autonomous vehicle to follow a first portion of the normal path plan.

An occurrence of a fault condition is represented by block 1020, where the fault condition may occur in one or more of multiple ways, and where the fault condition may be occur within an initial portion of the first time period. In an embodiment, a fault condition may occur when the computing device fails to access, within the predetermined initial portion of the first time period, an additional set of signals descriptive of an updated current state of the environment in which the autonomous vehicle is operating. In another embodiment, a fault condition may occur when the computing device accesses an additional set of signals descriptive of an updated current state of the environment in which the autonomous vehicle is operating, and determines that the additional set of signals is insufficient to generate an updated normal path plan and an updated safe path plan.

In an further embodiment, a fault condition may occur when the computing device generates, based on an updated set of signals descriptive of an updated current state of the environment in which the autonomous vehicle is operating, (i) an updated normal path plan to move the autonomous vehicle toward the destination during a second time period, and (ii) an updated safe path plan to safely stop the autonomous vehicle during the second time period, and determines that at least one of the updated normal path plan and the updated safe path plan is malformatted (or otherwise that there is an error associated with at least one of the updated normal path plan and the updated safe path plan).

If a fault condition does not occur ("NO"), processing may return to block 1005 in which the computing system may generate, based on an updated set of signals descriptive of an updated current state of the environment in which the autonomous vehicle is operating, an updated normal path plan to move the autonomous vehicle toward the destination during a second period of time. The computing device may similarly perform and repeat blocks (1010), (1015), and (1020) indefinitely or as necessary.

If a fault condition does occur ("YES"), the computing device may cause (block 1025) the autonomous vehicle to follow the safe path plan. In particular, the computing device may cease causing the autonomous vehicle to follow the first portion of the normal path plan and, and then cause the autonomous vehicle to follow the safe path plan. In an embodiment, the computing device may cause the autonomous vehicle to follow the safe path plan immediately upon detecting the fault condition or at an expiration of the predetermined initial portion of the first time period.

The computing device may further determine (block 1030) that the autonomous vehicle is safely stopped. In particular, the computing device may determine safe stoppage based on processing a set of signals descriptive of a current state of the environment in which the autonomous vehicle is operating. If the autonomous vehicle is not safely stopped, the computing device may generate a subsequent safe path plan, and cause the autonomous vehicle to follow the subsequent safe path plan until the autonomous vehicle is safely stopped.

Figure 11:
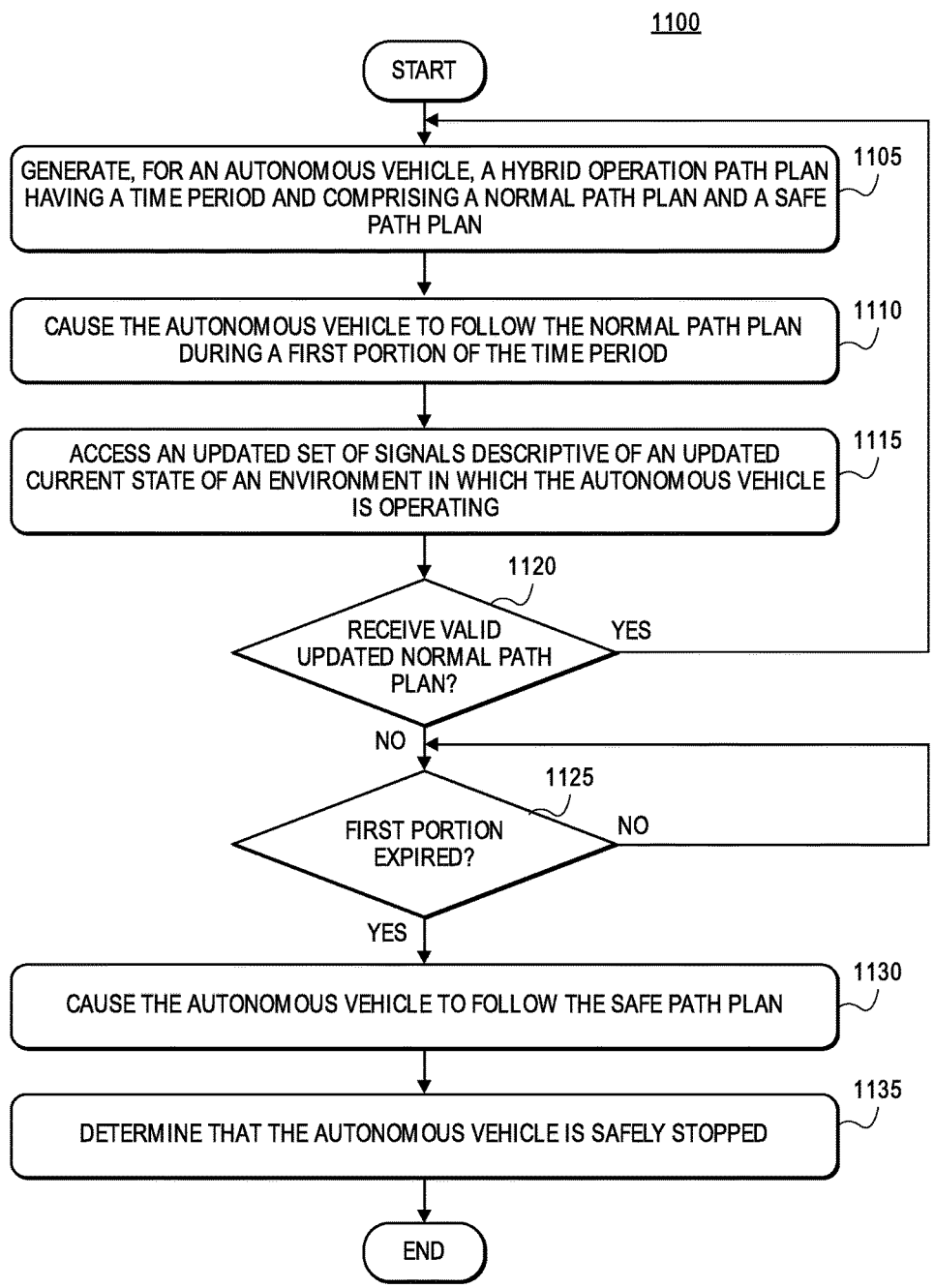
FIG. 11 is a flow diagram of another example method of managing operation of an autonomous vehicle moving toward a destination, in accordance with some embodiments.

FIG. 11 depicts an example method 1100 for managing operation of an autonomous vehicle moving toward a destination. The method 1100 may be implemented and performed by the computing system 600 of FIG. 6 (e.g., by the processor(s) 602 when executing the instructions 606 stored in memory 604), for example, or by another suitable computing device or system.

The method 1100 may begin when the computing system generates (block 1105), for the autonomous vehicle, a hybrid operation path plan having a time period and comprising a normal path plan and a safe path plan. The normal path plan is intended to move the autonomous vehicle toward the destination during a first portion of the time period, and the safe path plan is intended to safely stop the autonomous vehicle during a second portion of the time period subsequent to the first portion of the time period. The computing system may generate the hybrid operation path plan by one or more processors processing a set of signals descriptive of a current state of an environment in which the autonomous vehicle is operating.

The computing system may cause (1110) the autonomous vehicle to follow the normal path plan during the first portion of the time period. During the first portion of the time period (i.e., prior to expiration of the first portion of the time period), the computing system may at least attempt to access (block 1115) an updated set of signals descriptive of an updated current state of an environment in which the autonomous vehicle is operating.

At block 1120, a valid updated normal path plan may or may not be received before expiration of the first portion of the time period. It should be appreciated that the functionality of block 1120 may be passive (i.e., a condition may occur) or active (i.e., the computing device may explicitly detect a condition). In an embodiment, a valid updated normal path plan may not be received if the computing system is not able to access or fails to receive an updated set of signals, or otherwise that a valid updated hybrid operation path plan is not available prior to expiration of the first portion of the time period. In another embodiment, the computing device may access an updated set of signals and determine that the updated set of signals is insufficient to generate an updated hybrid operation path plan. In an further embodiment, the computing device may generate an updated hybrid operation path plan based on an updated set of signals and determine that the updated hybrid operation path plan is malformatted (or otherwise that there is an error associated with the updated hybrid operation path plan).

If a valid updated normal path plan is received ("YES"), processing may return to block 1105 in which the computing system may generate, based on an updated set of signals descriptive of an updated current state of the environment in which the autonomous vehicle is operating, an updated hybrid operation path plan having an additional time period and comprising an updated normal path plan and an updated safe path plan. The updated normal path plan is intended to move the autonomous vehicle toward the destination during a first portion of the additional time period, and the updated safe path plan is intended to safely stop the autonomous vehicle during a second portion of the additional time period subsequent to the first portion of the additional time period. In embodiments, after the computing system generates the updated hybrid operation path plan (or in response to receiving the updated set of signals), the computing device may discard the safe path plan of the original hybrid operation path plan. The computing device may similarly perform and repeat blocks (1110), (1115), and (1120) indefinitely or as necessary.

If a valid updated normal path plan is not received ("NO"), the computing device may, at block 1125, continue to cause the autonomous vehicle to follow the normal path plan until the first portion of the time period expires ("NO"). Upon expiration of the first portion of the time period ("YES"), the computing device may cause (block 1130) the autonomous vehicle to follow the safe path plan.

In an implementation, after the first portion of the time period has expired and after the computing device has initiated the safe path plan, the computing device may access an updated set of signals descriptive of an updated current state of the environment in which the autonomous vehicle is operating, thereby indicating that the fault condition may no longer exist. In this implementation, the computing device may accordingly generate an updated hybrid operation path plan having an additional time period and comprising an updated normal path plan and an updated safe path plan. Accordingly, the computing device may cease causing the autonomous vehicle to follow the safe path plan and may transition to causing the autonomous vehicle to follow the updated normal path plan.

The computing device may further determine (block 1135) that the autonomous vehicle is safely stopped. In particular, the computing device may determine safe stoppage based on processing a set of signals descriptive of a current state of the environment in which the autonomous vehicle is operating. If the autonomous vehicle is not safely stopped, the computing device may generate a subsequent safe path plan, and cause the autonomous vehicle to follow the subsequent safe path plan until the autonomous vehicle is safely stopped.

Figure 12:
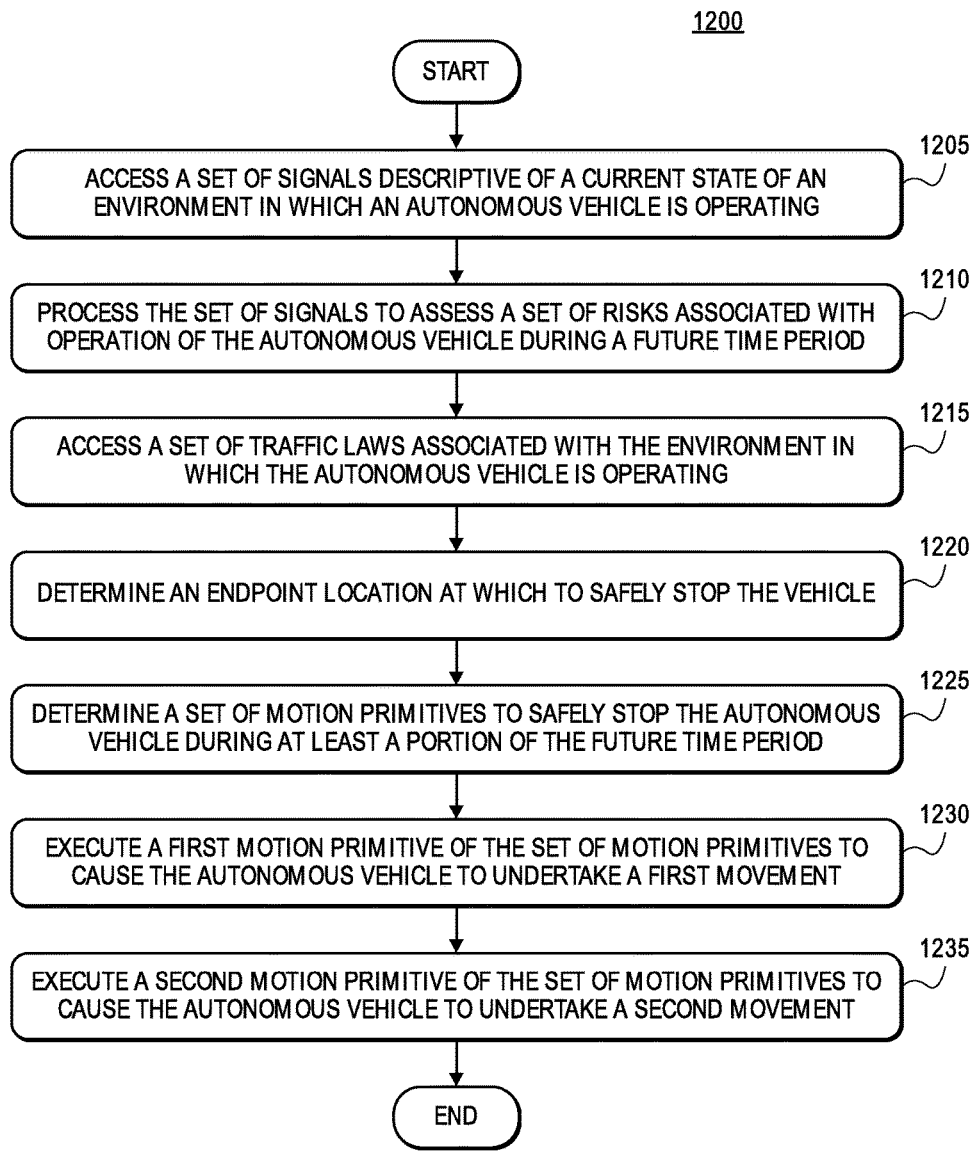
FIG. 12 is a flow diagram of an example method of determining operation of an autonomous vehicle, in accordance with some embodiments.

FIG. 12 depicts an example method 1200 for determining operation of an autonomous vehicle. The method 1200 may be implemented and performed by the computing system 600 of FIG. 6 (e.g., by the processor(s) 602 when executing the instructions 606 stored in memory 604), for example, or by another suitable computing device or system.

The method 1200 may begin when the computing system accesses (block 1205) a set of signals descriptive of a current state of an environment in which an autonomous vehicle is operating. In particular, the set of signals may originate based on sensor data generated by one or more sensors disposed throughout or otherwise associated with the autonomous vehicle. According to embodiments, there may be a lapse of time associated with the set of signals, where the lapse of time may be a time duration between the current time and a time that the set of signals was generated or accessed (i.e., a measure of how recent the set of signals is).

The computing system may process (block 1210) the set of signals to assess a set of risks associated with operation of the autonomous vehicle during a future time period. According to embodiments, the set of risks may be related to any combination of an availability of sensor data, additional vehicles or pedestrians in a vicinity of the autonomous vehicle, the general operating environment of the autonomous vehicle, and/or other factors. In a scenario, the computing system may detect, from the set of signals, an additional vehicle(s) in a vicinity of the autonomous vehicle, and estimate a set(s) of future movements of the additional vehicle(s) during at least the portion of the future time period. In some situations, the computing system may be able to access current sensor data from the one or more sensors, in which case the computing system may access a set of most recently available signals descriptive of the environment, and process the set of most recently available signals.

The computing system may, in an implementation, access (block 1215) a set of traffic laws associated with the environment in which the autonomous vehicle is operating. In particular, the set of traffic laws may apply to a roadway(s) on which the autonomous vehicle is operating. The computing system may also, in an implementation, determine (block 1220) an endpoint location at which to safely stop the vehicle.

The computing system may determine (block 1225) a set of motion primitives to safely stop the autonomous vehicle during at least a portion of the future time period. According to embodiments, the computing device may determine the set of motion primitives from a predetermined set of motion primitives. In embodiments, the computing system may determine the set of motion primitives based on the set of risks assessed in block 1210, as well as one or more of the set(s) of future movements of the additional vehicle(s), the set of traffic laws, the lapse of time associated with the set of signals, and/or other factors.

The set of motion primitives may include (i) a first motion primitive indicative of a first movement to be undertaken by the autonomous vehicle, and (ii) a second motion primitive indicative of a second movement to be undertaken by the autonomous vehicle after undertaking the first movement. It should be appreciated that the set of motion primitives may include additional motion primitives. Each motion primitive of the set of motion primitives may have an associated time period, where the associated time periods may be the same or different. In an implementation in which the computing device determines the endpoint location at which to safely stop the autonomous vehicle, the computing device may determine the set of motion primitives to move the autonomous vehicle from a current location to the endpoint location during at least the portion of the future time period.

The computing device may execute (block 1230) the first motion primitive of the set of motion primitives to cause the autonomous vehicle to undertake the first movement. Additionally, the computing device may execute (block 1235) the second motion primitive of the set of motion primitives to cause the autonomous vehicle to undertake the second movement. The computing device may further execute any additional motion primitives to cause the autonomous vehicle to undertake any additional movements. As a result of the computing device executing the set of motion primitives, the autonomous vehicle may be safely stopped.

General Considerations

In some cases, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A computer-implemented method of managing operation of an autonomous vehicle moving toward a destination, the method comprising:
    generating, by one or more processors processing a set of signals descriptive of a current state of an environment in which the autonomous vehicle is operating, a normal path plan to (i) move the autonomous vehicle toward the destination during a first time period, and (ii) begin execution at a first time of the first time period;
    generating, by the one or more processors processing the set of signals descriptive of the current state of the environment in which the autonomous vehicle is operating, a safe path plan to (i) safely stop the autonomous vehicle during the first time period, and (ii) begin execution at a second time of the first time period after the first time;
    causing, by the one or more processors and during a first portion of the first time period, the autonomous vehicle to follow a first portion of the normal path plan;
    detecting, by the one or more processors and within a predetermined initial portion of the first time period, a fault condition associated with operation of the autonomous vehicle;
    after detecting the fault condition, causing, by the one or more processors, the autonomous vehicle to follow the safe path plan;
    subsequent to causing the autonomous vehicle to follow the safe path plan, generating, by the one or more processors processing an updated set of signals descriptive of an updated current state of the environment in which the autonomous vehicle is operating, (i) an updated normal path plan to move the autonomous vehicle toward the destination during a second time period, and (ii) an updated safe path plan to safely stop the autonomous vehicle during the second time period; and
    causing, by the one or more processors and during a first portion of the second time period, the autonomous vehicle to cease following the safe path plan and return to normal operation by following a first portion of the updated normal path plan.

2. The computer-implemented method of claim 1, further comprising:
    subsequent to causing the autonomous vehicle to follow the first portion of the updated normal path plan, generating, by the one or more processors processing a second updated set of signals descriptive of a second updated current state of the environment in which the autonomous vehicle is operating, (i) a second updated normal path plan to move the autonomous vehicle toward the destination during a third time period, and (ii) a second updated safe path plan to safely stop the autonomous vehicle during the third time period; and causing, by the one or more processors and during a first portion of the third time period, the autonomous vehicle to follow a first portion of the second updated normal path plan.

3. The computer-implemented method of claim 1, wherein detecting the fault condition comprises:

failing to access, within the predetermined initial portion of the first time period, an additional set of signals descriptive of another updated current state of the environment in which the autonomous vehicle is operating.

4. The computer-implemented method of claim 1, wherein detecting the fault condition comprises:

accessing an additional set of signals descriptive of another updated current state of the environment in which the autonomous vehicle is operating; and determining that the additional set of signals is insufficient to generate an additional updated normal path plan and an additional updated safe path plan.

5. The computer-implemented method of claim 1, wherein detecting the fault condition comprises:

generating, by the one or more processors processing an additional set of signals descriptive of another updated current state of the environment in which the autonomous vehicle is operating, (i) an additional updated normal path plan to move the autonomous vehicle toward the destination during a third time period, and (ii) an additional updated safe path plan to safely stop the autonomous vehicle during the third time period; and determining that at least one of the additional updated normal path plan and the additional updated safe path plan is malformatted.

6. The computer-implemented method of claim 1, wherein after detecting the fault condition, causing, by the one or more processors, the autonomous vehicle to follow the safe path plan comprises:

at an expiration of the predetermined initial portion of the first time period, causing, by the one or more processors, the autonomous vehicle to follow the safe path plan.

7. The computer-implemented method of claim 1, further comprising, after causing the autonomous vehicle to follow the safe path plan:

determining that the fault condition has ceased, wherein the autonomous vehicle is caused to cease following the safe path plan and return to normal operation in response to determining that the fault condition has ceased.

8. A non-transitory computer-readable medium storing thereon instructions executable by one or more processors to implement a control architecture for controlling an autonomous vehicle, comprising:

instructions for receiving sensor data generated by one or more sensors of the autonomous vehicle, wherein the one or more sensors are configured to sense an environment in which the autonomous vehicle is operating;

instructions for generating, based on the sensor data, a set of signals descriptive of a current state of the environment;

instructions for generating, based on the set of signals descriptive of the current state of the environment, a normal path plan to move the autonomous vehicle toward a destination during a first time period;

instructions for generating, based on the set of signals, a safe path plan to safely stop the autonomous vehicle during the first time period;

instructions for causing, during a first portion of the first time period, the autonomous vehicle to follow a first portion of the normal path plan;

instructions for, in response to a fault condition associated with operation of the autonomous vehicle being detected within a predetermined initial portion of the first time period, causing the autonomous vehicle to follow the safe path plan;

instructions for generating, subsequent to causing the autonomous vehicle to follow the safe path plan and based on an updated set of signals descriptive of an updated current state of the environment in which the autonomous vehicle is operating, (i) an updated normal path plan to move the autonomous vehicle toward the destination during a second time period, and (ii) an updated safe path plan to safely stop the autonomous vehicle during the second time period; and instructions for causing, during a first portion of the second time period, the autonomous vehicle to cease following the safe path plan and return to normal operation by following a first portion of the updated normal path plan.

9. The non-transitory computer-readable medium of claim 8, further comprising:

instructions for generating, subsequent to causing the autonomous vehicle to follow the first portion of the updated normal path plan and based on a second updated set of signals descriptive of a second updated current state of the environment in which the autonomous vehicle is operating, (i) a second updated normal path plan to move the autonomous vehicle toward the destination during a third time period, and (ii) a second updated safe path plan to safely stop the autonomous vehicle during the third time period; and instructions for causing, during a first portion of the third time period, the autonomous vehicle to follow a first portion of the second updated normal path plan.

10. The non-transitory computer-readable medium of claim 8, further comprising:

instructions for detecting the fault condition when, within the predetermined initial portion of the first time period, an additional set of signals descriptive of another updated current state of the environment in which the autonomous vehicle is operating is not accessed.

11. The non-transitory computer-readable medium of claim 8, further comprising:

instructions for detecting the fault condition when (i) an additional set of signals descriptive of another updated current state of the environment in which the autonomous vehicle is operating is accessed, and (ii) the additional set of signals is insufficient to generate an additional updated normal path plan and an additional updated safe path plan.

12. The non-transitory computer-readable medium of claim 8, further comprising instructions for detecting the fault condition comprising:

instructions for generating, based on an additional set of signals descriptive of another updated current state of the environment in which the autonomous vehicle is operating, (i) an additional updated normal path plan to move the autonomous vehicle toward the destination during a third time period, and (ii) an additional updated safe path plan to safely stop the autonomous vehicle during the third time period, and instructions for determining that at least one of the additional updated normal path plan and the additional updated safe path plan is malformatted.

13. The non-transitory computer-readable medium of claim 8, wherein the instructions for causing the autonomous vehicle to follow the safe path plan comprise:

instructions for causing the autonomous vehicle to follow the safe path plan at an expiration of the predetermined initial portion of the first time period.

14. The non-transitory computer-readable medium of claim 8, further comprising:

instructions for determining, after causing the autonomous vehicle to follow the safe path plan, that the fault condition has ceased, wherein the instructions for causing the autonomous vehicle to cease following the safe path plan and return to normal operation are executed in response to determining that the fault condition has ceased.

15. A system within an autonomous vehicle, the system comprising:

a set of sensors configured to generate a set of sensor data associated with operation of the autonomous vehicle; and a computing system configured to:

generate, based on the set of sensor data, a set of signals descriptive of a current state of an environment in which the autonomous vehicle is operating, process the set of signals to:

generate a normal path plan to (i) move the autonomous vehicle toward a destination during a first time period, and (ii) begin execution at a first time of the first time period, and generate a safe path plan to (i) safely stop the autonomous vehicle during the first time period, and (ii) begin execution at a second time of the first time period after the first time, cause, during a first portion of the first time period, the autonomous vehicle to follow a first portion of the normal path plan, detect, within a predetermined initial portion of the first time period, a fault condition associated with operation of the autonomous vehicle, after detecting the fault condition, cause the autonomous vehicle to follow the safe path plan, subsequent to causing the autonomous vehicle to follow the safe path plan, generate an updated set of signals descriptive of an updated current state of the environment in which the autonomous vehicle is operating, and process the updated set of signals to:

generate an updated normal path plan to move the autonomous vehicle toward the destination during a second time period, and generate an updated safe path plan to safely stop the autonomous vehicle during the second time period, and cause, during a first portion of the second time period, the autonomous vehicle to cease following the safe path plan and return to normal operation by following a first portion of the updated normal path plan.

16. The system of claim 15, wherein the computing system is further configured to:

subsequent to causing the autonomous vehicle to follow the first portion of the updated normal path plan, generate, based on a second updated set of signals descriptive of a second updated current state of the environment in which the autonomous vehicle is operating, (i) a second updated normal path plan to move the autonomous vehicle toward the destination during a third time period, and (ii) a second updated safe path plan to safely stop the autonomous vehicle during the third time period, and cause, during a first portion of the third time period, the autonomous vehicle to follow a first portion of the second updated normal path plan.

17. The system of claim 15, wherein to detect the fault condition, the computing system is configured to:

detect that the set of sensors fails to generate an updated set of sensor data associated with operation of the autonomous vehicle.

18. The system of claim 15, wherein to detect the fault condition, the computing system is configured to:

generate, based on an updated set of sensor data, an additional set of signals descriptive of another updated current state of the environment in which the autonomous vehicle is operating, and determine that the additional set of signals is insufficient to generate an additional updated normal path plan and an additional updated safe path plan.

19. The system of claim 15, wherein to detect the fault condition, the computing system is configured to:

generate, based on an additional set of signals descriptive of another updated current state of the environment in which the autonomous vehicle is operating, (i) an additional updated normal path plan to move the autonomous vehicle toward the destination during a third time period, and (ii) an additional updated safe path plan to safely stop the autonomous vehicle during the third time period, and determine that at least one of the additional updated normal path plan and the additional updated safe path plan is malformatted.

20. The system of claim 15, wherein to cause the autonomous vehicle to follow the safe path plan, the computing system is configured to:

at an expiration of the predetermined initial portion of the first time period, cause the autonomous vehicle to follow the safe path plan.

* * * * *